United States Patent
Hirose et al.

(10) Patent No.: US 9,090,233 B2
(45) Date of Patent: Jul. 28, 2015

(54) VEHICLE BRAKE HYDRAULIC PRESSURE CONTROL APPARATUS

(71) Applicant: NISSIN KOGYO CO., LTD., Nagano (JP)

(72) Inventors: Tomonori Hirose, Nagano (JP); Keisuke Wakizaka, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 168 days.

(21) Appl. No.: 13/796,925

(22) Filed: Mar. 12, 2013

(65) Prior Publication Data

US 2013/0245909 A1    Sep. 19, 2013

(30) Foreign Application Priority Data

Mar. 15, 2012  (JP) ................................ 2012-059348
Mar. 15, 2012  (JP) ................................ 2012-059349
Mar. 15, 2012  (JP) ................................ 2012-059350

(51) Int. Cl.
*B60T 8/1764* (2006.01)
*B60T 8/1755* (2006.01)

(52) U.S. Cl.
CPC ........... *B60T 8/1764* (2013.01); *B60T 8/17551* (2013.01)

(58) Field of Classification Search
None
See application file for complete search history.

(56) References Cited

U.S. PATENT DOCUMENTS

| | | | |
|---|---|---|---|
| 6,625,529 B2 * | 9/2003 | Obata et al. ..................... | 701/41 |
| 6,968,920 B2 * | 11/2005 | Barton et al. ................. | 180/446 |
| 7,481,500 B2 * | 1/2009 | Miyazaki et al. .......... | 303/122.1 |
| 7,530,648 B2 * | 5/2009 | Obai .......................... | 303/119.1 |
| 8,100,482 B2 * | 1/2012 | Kito et al. ...................... | 303/148 |
| 2002/0030407 A1 | 3/2002 | Nishizaki et al. | |
| 2004/0016591 A1* | 1/2004 | Kojo et al. ..................... | 180/443 |
| 2004/0124701 A1 | 7/2004 | Nihei et al. | |
| 2005/0065697 A1 | 3/2005 | Niino et al. | |

(Continued)

FOREIGN PATENT DOCUMENTS

JP   H06344884   12/1994
JP   2002002474   1/2001

(Continued)

OTHER PUBLICATIONS

U.S. Appl. No. 13/724,707, filed Dec. 21, 2012, not yet published.

(Continued)

*Primary Examiner* — Mussa A Shaawat
(74) *Attorney, Agent, or Firm* — Andrew M. Calderon; Roberts Mlotkowski Safran & Cole, P.C.

(57) ABSTRACT

A vehicle brake hydraulic pressure control apparatus includes an adding section and a control differential pressure setting section. The adding section adds a feedback differential pressure obtained by executing a PI operation in accordance with a yaw rate deviation which is a difference between a target yaw rate being set to a value at which a vehicle turns to a higher coefficient-of-friction road side and an actual yaw rate and a feedforward differential pressure obtained by adding (i) a differential pressure based on a steering angle and (ii) a differential pressure based on a velocity of a vehicle body and the target yaw rate. The control differential pressure setting section sets a control differential pressure based on a value obtained by the adding section, after a predetermined time elapses since start of differential pressure control.

19 Claims, 16 Drawing Sheets

(56) References Cited

U.S. PATENT DOCUMENTS

| | | | |
|---|---|---|---|
| 2005/0189163 A1* | 9/2005 | Barton et al. | 180/446 |
| 2006/0255659 A1* | 11/2006 | Obai | 303/146 |
| 2007/0029875 A1* | 2/2007 | Kurosaki et al. | 303/187 |
| 2009/0095551 A1* | 4/2009 | Sawada et al. | 180/197 |
| 2009/0127929 A1* | 5/2009 | Sawada et al. | 303/122.09 |
| 2010/0270855 A1* | 10/2010 | Sawada | 303/113.2 |
| 2011/0077834 A1 | 3/2011 | Kudo et al. | |

FOREIGN PATENT DOCUMENTS

| | | |
|---|---|---|
| JP | 2001294144 | 10/2001 |
| JP | 2004210083 | 7/2004 |
| JP | 2005088665 | 4/2005 |
| JP | 2005262925 | 9/2005 |
| JP | 2007055583 | 3/2007 |
| JP | 2008110708 | 5/2008 |
| JP | 2011073575 | 4/2011 |

OTHER PUBLICATIONS

U.S. Appl. No. 13/724,716, filed Dec. 21, 2012, not yet published.

Japanese Office Action for related JP application No. 2014-058137, dated Apr. 28, 2015, 4 pages.

* cited by examiner

Feedforward Differential Pressure

Feedback Differential Pressure

Added Differential Pressure

FIG. 18A
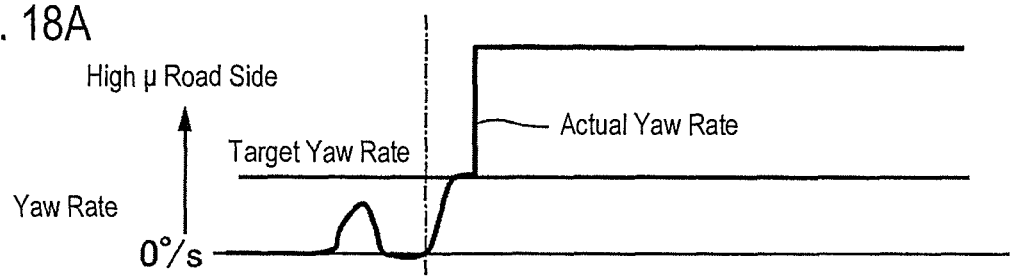
FIG. 18B
FIG. 18C
FIG. 19A
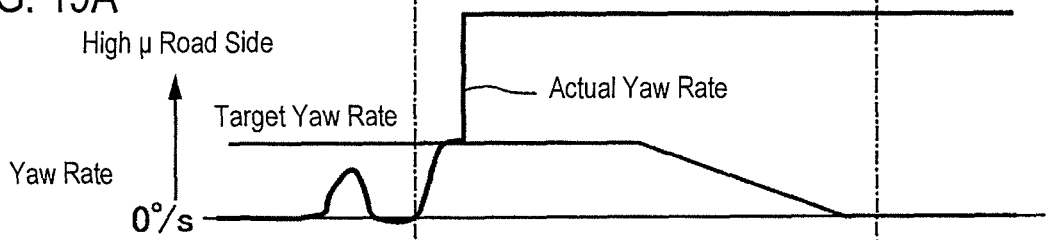
FIG. 19B
FIG. 19C
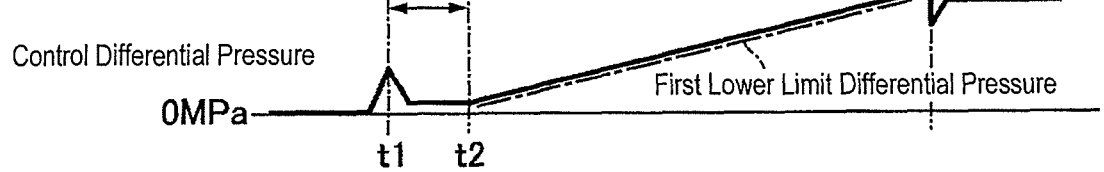

*1: Upper Limit Value of Positive Amount of Change of Control Differential Pressure with respect to Time

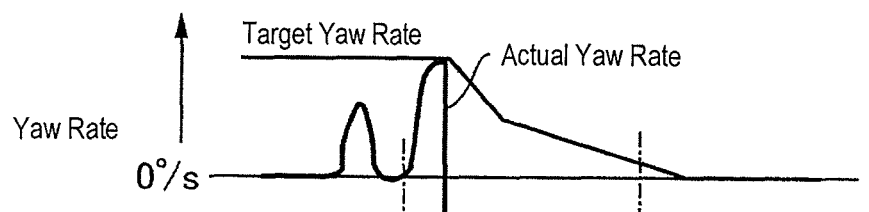

FIG. 24A
High μ Road Side
Target Yaw Rate
Actual Yaw Rate
Yaw Rate
0°/s

FIG. 24B
Steering Angle
0°

FIG. 24C
*1
T1
*2
Control Differential Pressure
0MPa
t1  t2

*1: Upper Limit Value of Positive Amount of Change of Control Differential Pressure with respect to Time in Low Differential Pressure Region
*2: Upper Limit Value of Positive Amount of Change of Control Differential Pressure with respect to Time in High Differential Pressure Region

VEHICLE BRAKE HYDRAULIC PRESSURE CONTROL APPARATUS

CROSS REFERENCE TO RELATED APPLICATION

This application is based on and claims priority under 35 U.S.C. §119 to Japanese Patent Application Nos. 2012-59348, 2012-59349, and 2012-59350 (all of which were filed on Mar. 15, 2012), the entire contents of which are incorporated herein by reference.

BACKGROUND

1. Technical Field

The invention relates to a vehicle brake hydraulic pressure control apparatus.

2. Description of the Related Art

JP 2007-55583 A (corresponding to US 2007/0029875 A1) describes a vehicle brake hydraulic pressure control apparatus that executes the antilock braking control for wheel brakes for right and left front wheels and right and left rear wheels independently from each other. In this vehicle brake hydraulic pressure control apparatus, when a vehicle is running during the antilock braking control on a split road in which coefficients of friction of right and left road surfaces with which the front and rear wheels are in contact are greatly different from each other, brake hydraulic pressures are controlled so that a differential pressure is generated between the brake hydraulic pressures of the right and left wheel brakes.

SUMMARY

In such a vehicle brake hydraulic pressure control apparatus, when the differential pressure control is executed while the vehicle is running on the split road, it may be conceived that a differential pressure is determined in accordance with a drop amount in a wheel speed on a higher coefficient-of-friction road side since start of the differential pressure control. However, there may be a case where the vehicle is slid laterally due to unbalance between (i) a steering angle by driver's steering operation and (ii) a difference between the brake hydraulic pressures of the right and left wheel brakes. There may also be a case where the stability of the vehicle is varied due to a difference in the steering operation.

The invention has been made under the above circumstances and provides a vehicle brake hydraulic pressure control apparatus that ensures the stability of the vehicle by balancing the steering angle and the difference between the brake hydraulic pressures of the right and left wheel brakes and that ensures a sufficient braking force.

(1) According to an aspect of the invention, a vehicle brake hydraulic pressure control apparatus includes a hydraulic pressure adjusting unit, a split road determining section, a steering angle sensor, a yaw rate sensor, a vehicle body velocity, a target yaw rate setting section, a yaw rate deviation calculation section, a feedback differential pressure calculation section, a feedforward differential pressure calculation section, an adding section, a control differential pressure setting section, and a hydraulic pressure adjusting and driving section. The hydraulic pressure adjusting unit individually adjusts brake hydraulic pressures acting on wheel brakes for right and left front wheels and right and left rear wheels. The split road determining section determines as to whether or not road surfaces which the right wheels and the left wheels are in contact with constitute a split road in which coefficients of friction of the road surfaces are different from each other. If the split road determining section determines that the road surfaces constitute the split road when antilock braking control is executed, the hydraulic pressure adjusting unit is controlled to execute differential pressure control so that the brake hydraulic pressures of the wheel brakes on a higher coefficient-of-friction road side are higher than those of the wheel brakes on a lower coefficient-of-friction road side. The steering angle sensor detects a steering angle. The yaw rate sensor detects an actual yaw rate of a vehicle. The vehicle body velocity acquiring section acquires a velocity of a vehicle body. The target yaw rate setting section sets a target yaw rate based on the steering angle and the velocity of the vehicle body so as to be a value at which the vehicle turns to the higher coefficient-of-friction road side. The yaw rate deviation calculation section calculates a yaw rate deviation which is a difference between the target yaw rate and the actual yaw rate. The feedback differential pressure calculation section executes a PI operation in accordance with the yaw rate deviation to calculate a feedback differential pressure between the brake hydraulic pressures of the right and left wheel brakes so that the actual yaw rate approaches the target yaw rate. The feedforward differential pressure calculation section adds (i) a differential pressure based on the steering angle and (ii) a differential pressure based on the velocity of the vehicle body and the target yaw rate to obtain a feedforward differential pressure between the brake hydraulic pressures of the right and left wheel brakes. The adding section adds the feedback differential pressure and the feedforward differential pressure. The control differential pressure setting section sets a control differential pressure between the brake hydraulic pressures of the right and left wheel brakes based on a value obtained by the adding section, after a first setting time elapses since start of the differential pressure control. The hydraulic pressure adjusting and driving section drives the hydraulic pressure adjusting unit in accordance with the control differential pressure set by the control differential pressure setting section.

With the configuration of (1), the feedback difference pressure calculation section executes the PI operation in accordance with the yaw rate deviation to calculate the feedback differential pressure between the brake hydraulic pressures of the right and left wheel brakes. The feedforward differential pressure calculation section that adds (i) the differential pressure based on the steering angle and (ii) the differential pressure based on the velocity of the vehicle body and the target yaw rate to calculate the feedforward differential pressure between the brake hydraulic pressures of the right and left wheel brakes. After the first setting time elapses since the start of the differential pressure control, the control differential pressure setting section sets the control differential pressure between the brake hydraulic pressures of the right and left wheel brakes based on the value obtained by adding the feedback differential pressure and the feedforward differential pressure. Then, the hydraulic pressure adjusting and driving section drives the hydraulic pressure adjusting unit in accordance with the control differential pressure set by the control differential pressure setting section. Therefore, it is possible to balance (i) the steering angle by driver's steering operation and (ii) the difference between the brake hydraulic pressures of the right and left wheel brakes. Thus, it is possible to prevent that the vehicle is slid laterally and/or that the stability of the vehicle is varied due to the difference in the steering operation. Furthermore, the target yaw rate setting section sets the target yaw rate based on the steering angle and the velocity of the vehicle body so as to be the value at which the vehicle turns to the higher coefficient-of-friction road side. Therefore, the driver turns the steering wheel to a side which suppresses that the vehicle turns in a direction indicated by the target yaw rate. Accordingly, it is possible to make the control differential pressure between the brake hydraulic pressures of the right and left wheel brakes further large so as to ensure a sufficient braking force.

(2) In the configuration of (1), the target yaw rate setting section may set the target yaw rate so that the target yaw rate becomes smaller as the steering angle gets larger.

Also, with the configuration of (2), the target yaw rate is set so that the target yaw rate becomes smaller as the steering angle gets larger. Therefore, even if the control differential pressure becomes sufficiently large and it is started to execute the antilock braking control for the wheel brake(s) on the higher coefficient-of-friction road side, the target yaw rate becomes small immediately before the start of the antilock braking control. Thereby, a steering speed becomes small, and an imbalance between the steering angle and the differential pressure does not occur during the antilock braking control. Also, it is possible to suppress that the vehicle body is slid to the low coefficient-of-friction road side due to the antilock braking control.

(3) The configuration of (1) or (2) may further include a first lower limit setting section. The first lower limit setting section sets a first lower limit differential pressure, which changes by an amount of change corresponding to the velocity of the vehicle body, based on the control differential pressure which is set by the control differential pressure setting section at a time at which the first setting time elapses since the start of the differential pressure control. The control differential pressure setting section may set the control differential pressure to larger one of the value obtained by the adding section and the first lower limit differential pressure set by the first lower limit setting section.

With the configuration of (3), the first lower limit setting section sets the first lower limit differential pressure, which changes by the amount of change corresponding to the velocity of the vehicle body, based on the control differential pressure which is set by the control differential pressure setting section at the time at which the first setting time elapses since the start of the differential pressure control. The control differential pressure setting section sets the control differential pressure to larger one of the value obtained by the adding section and the first lower limit differential pressure set by the first lower limit setting section. Therefore, even if at least one of the yaw rate sensor and the steering sensor breaks down, it is possible to ensure the minimum control differential pressure. As a result, it is possible to prevent the braking force from being reduced.

(4) The configuration of any one of (1) to (3) may further include a limit value setting section. The limit value setting section sets an upper limit value of a positive amount of change of the control differential pressure with respect to time. The control differential pressure setting section sets the control differential pressure so that the control differential pressure changes by an amount of change being equal to or lower than the upper limit value set by the limit value setting section.

With the configuration of (4), the positive amount of change of the control differential pressure with respect to time is equal to or less than the limit value set by the limit value setting section. Therefore, even if at least one of the yaw rate sensor and the steering sensor breaks down, it is possible to avoid that the control differential pressure increases sharply and to ensure the stability.

(5) In the configuration of (4), the limit value setting section may set the upper limit value based on the control differential pressure.

(6) In the configuration of (5), if the control differential pressure set by the control differential pressure setting section is in a low differential pressure region after a time at which the first setting time elapses since the start of the differential pressure control, the limit value setting section may set the upper limit value to be large. If the control differential pressure set by the control differential pressure setting section is in a high differential pressure region after the time at which the first setting time elapses since the start of the differential pressure control, the limit value setting section may set the upper limit value to be small.

With the configuration of (6), if the control differential pressure set by the control differential pressure setting section is in a low differential pressure region after a time at which the first setting time elapses since the start of the differential pressure control, the limit value setting section sets the upper limit value to be large. If the control differential pressure set by the control differential pressure setting section is in a high differential pressure region after the time at which the first setting time elapses since the start of the differential pressure control, the limit value setting section sets the upper limit value to be small. Therefore, it is possible to ensure the braking performance even in the low differential pressure region in which the braking performance is largely affected. Also, it is possible to ensure the stability even in the high differential pressure region in which the stability is largely affected.

(7) In the configuration (6), when the control differential pressure changes from the low differential pressure region to the high differential pressure region, the limit value setting section may change the upper limit value so that the upper limit value decreases gradually.

With the configuration of (7), when the control differential pressure changes from the low differential pressure region to the high differential pressure region, the upper limit value is changed so as to decrease gradually. Thereby, it is possible to smoothly switch between ensuring the braking performance in the low differential pressure region and ensuring the stability in the high differential pressure region.

(8) In the configuration of any one of (4) to (7), the limit value setting section may set the upper limit value to be small as the velocity of the vehicle body increases.

With the configuration of (8), the upper limit value becomes small as the velocity of the vehicle body increases. Thereby, even if the upper limit value is set to be large, it is possible to prioritize ensuring the braking performance, by setting the upper limit value to be large, in a low vehicle velocity state in which the vehicle behavior less changes. Also, it is possible to prioritize ensuring the stability, by setting the upper limit value to be small, in a high vehicle velocity state in which the vehicle behavior changes largely if the upper limit value is set to be large.

(9) The configuration of (3) may further include a hydraulic pressure acquiring section, a second lower limit setting section, a steering angle determination section, and a selection section. The hydraulic pressure acquiring section acquires at least the brake hydraulic pressures of the wheel brakes for the right and left front wheels. The second lower limit setting section sets, based on the control differential pressure set by the control differential pressure setting section a time at which the first setting time elapses since the start of the differential pressure control, a second lower limit differential pressure which changes, by an amount of change corresponding to the velocity of the vehicle body acquired by the vehicle body velocity acquiring section, more moderately than the first lower limit differential pressure changes. The steering angle determination section determines that the steering angle is in a fixed state, if a state continues for a second setting time in which the steering angle is below a steering angle threshold value which is determined in accordance with a difference between the brake hydraulic pressures, acquired by the hydraulic pressure acquiring section, of the wheel brakes for the right and left front wheels. The selection section selects the second lower limit differential pressure in place of the first lower limit differential pressure to input the second lower limit differential pressure to the control differential pressure setting section, if the steering angle determination section determines that the steering angle is in the fixed state. If the steering angle determination section determines that the steering angle is in the fixed state, the control differential pressure setting section may set the control differential pressure to larger one of the value obtained by the adding section and the second lower limit differential pressure.

With the configuration of (9), if the state continues for the second setting time in which the steering angle is below the steering angle threshold value which is determined in accordance with the difference between the brake hydraulic pressures of the wheel brakes for the right and left front wheels, it is determined that the steering angle is in the fixed state. In the state where the steering angle is fixed, the second lower limit differential pressure, which more moderately changes in accordance with the velocity of the vehicle body than the first lower limit differential pressure changes, is selected in place of the first lower limit differential pressure after the first setting time elapses since the start of the differential pressure control. The control differential pressure setting section sets the control differential pressure to larger one of the value obtained by the adding section and the second lower limit differential pressure. Thereby, in the state where the steering angle is fixed, it is possible to suppress such a phenomenon from occurring that a moment generated by the differential pressure between the brake hydraulic pressures of the right and left wheel brakes exceeds a moment generated by the steering angle. As a result, it is possible to ensure the stability when the differential pressure control is executed in the state where the steering angle is fixed.

It is noted that an estimated vehicle body velocity calculation section 26 of one embodiment which will be described later is one example of the vehicle body velocity acquiring section in the above configurations.

Also, in a vehicle brake hydraulic pressure control apparatus, there may be a case where when the differential pressure control is executed while the vehicle is running on the split road, the differential pressure control is executed based on at least one of a detection value of the steering sensor and a detection value of the yaw rate sensor. However, if the differential pressure becomes small due to failure of those sensors, there is a possibility that the braking force may not be enough.

Then, a vehicle brake hydraulic pressure control apparatus may be provided that sets the control differential pressure based on at least one of the detection values of the steering angle sensor and the yaw rate sensor and that can ensure the braking force even if at least one of the steering angle sensor and the yaw rate sensor brakes down.

(10) The configuration of (1) or (2) may further include a first lower limit setting section. The first lower limit setting section sets a first lower limit differential pressure which changes by an amount of change corresponding to the velocity of the vehicle body. The control differential pressure setting section may set the control differential pressure based on at least one of the steering angle detected by the steering angle sensor and the actual yaw rate detected by the yaw rate sensor. After the first setting time elapses since the start of the differential pressure control, the control differential pressure setting section may set the control differential pressure with using the first lower limit differential pressure as a minimum value of the control differential pressure.

With the configuration of (10), the first lower limit setting section sets the first lower limit differential pressure, which changes by the amount of change corresponding to the velocity of the vehicle body. The control differential pressure setting section sets the control differential pressure with using the first lower limit differential pressure as the minimum value of the control differential pressure. Therefore, even if at least one of the yaw rate sensor and the steering sensor brakes down, it is possible to ensure the minimal control differential pressure. As a result, it is possible to prevent the braking force from decreasing.

(11) The configuration of (10) may further include a limit value setting section. The limit value setting section may set an upper limit value of a positive amount of change of the control differential pressure with respect to time. The control differential pressure setting section may set the control differential pressure so that the control differential pressure changes by an amount of change being equal to or lower than the upper limit value set by the limit value setting section.

With the configuration of (11), the positive amount of change of the control differential pressure with respect to time is equal to or lower than the upper limit value set by the limit value setting section. Therefore, if at least one of the yaw rate sensor and the steering sensor brakes down, it is possible to avoid that the control differential pressure increases sharply. As a result, it is possible to ensure the stability.

(12) In the configuration of (11), the limit value setting section may set the upper limit value based on the control differential pressure.

(13) In the configuration of (12), if the control differential pressure set by the control differential pressure setting section is in a low differential pressure region after a time at which the first setting time elapses since the start of the differential pressure control, the limit value setting section may set the upper limit value to be large. If the control differential pressure set by the control differential pressure setting section is in a high differential pressure region after the time at which the first setting time elapses since the start of the differential pressure control, the limit value setting section may set the upper limit value to be small.

With the configuration of (13), if the control differential pressure set by the control differential pressure setting section is in the low differential pressure region after the time at which the first setting time elapses since the start of the differential pressure control, the upper limit value is set to be large. Also, if the control differential pressure set by the control differential pressure setting section is in the high differential pressure region after the time at which the first setting time elapses since the start of the differential pressure control, the upper limit value is set to be small. Therefore, it is possible to ensure the braking performance even in the low differential pressure region in which the braking performance is largely affected. Also, it is possible to ensure the stability even in the high differential pressure region in which the stability is largely affected.

(14) In the configuration of (13), when the control differential pressure changes from the low differential pressure region to the high differential pressure region, the limit value setting section changes the upper limit value so that the upper limit value decreases gradually.

With the configuration of (14), when the control differential pressure changes from the low differential pressure region to the high differential pressure region, the upper limit value is changed so that the upper limit value decreases gradually. Thereby, it is possible to smoothly switch between ensuring the braking performance in the low differential pressure region and ensuring the stability in the high differential pressure region.

(15) In the configuration of any one of (11) to (14), the limit value setting section may set the upper limit value to be small as the velocity of the vehicle body increases.

With the configuration of (15), the upper limit value becomes small as the velocity of the vehicle body increases. Thereby, even if the upper limit value is set to be large, it is possible to prioritize ensuring the braking performance, by setting the upper limit value to be large, in a low vehicle velocity state in which the vehicle behavior less changes. Also, it is possible to prioritize, ensuring the stability, by setting the upper limit value to be small, in a high vehicle velocity state in which the vehicle behavior changes largely if the upper limit value is set to be large.

(16) The configuration of (10) may further include a hydraulic pressure acquiring section, a second lower limit setting section, a steering angle determination section, and a selection section. The hydraulic pressure acquiring section acquires at least the brake hydraulic pressures of the wheel brakes for the right and left front wheels. The second lower limit setting section sets, based on the control differential pressure set by the control differential pressure setting section a time at which the first setting time elapses since the start of the differential pressure control, a second lower limit differential pressure which changes, by an amount of change corresponding to the velocity of the vehicle body acquired by the vehicle body velocity acquiring section, more moderately than the first lower limit differential pressure changes. The steering angle determination section determines that the steering angle is in a fixed state, if a state continues for a second setting time in which the steering angle is below a steering angle threshold value which is determined in accordance with a difference between the brake hydraulic pressures, acquired by the hydraulic pressure acquiring section, of the wheel brakes for the right and left front wheels. The selection section selects the second lower limit differential pressure in place of the first lower limit differential pressure to input the second lower limit differential pressure to the control differential pressure setting section, if the steering angle determination section determines that the steering angle is in the fixed state. If the steering angle determination section determines that the steering angle is in the fixed state, the control differential pressure setting section may set the control differential pressure with using the second lower limit differential pressure as a minimum value of the control differential pressure.

With the configuration of (16), if the state continues for the second setting time in which the steering angle is below the steering angle threshold value which is determined in accordance with the difference between the brake hydraulic pressures of the wheel brakes for the right and left front wheels, it is determined that the steering angle is in the fixed state. In the state where the steering angle is fixed, the second lower limit differential pressure, which more moderately changes in accordance with the velocity of the vehicle body than the first lower limit differential pressure changes, is selected in place of the first lower limit differential pressure after the first setting time elapses since the start of the differential pressure control. The control differential pressure setting section sets the control differential pressure to larger one of the value obtained by the adding section and the second lower limit differential pressure. Thereby, in the state where the steering angle is fixed, it is possible to suppress such a phenomenon from occurring that a moment generated by the differential pressure between the brake hydraulic pressures of the right and left wheel brakes exceeds a moment generated by the steering angle. As a result, it is possible to ensure the stability when the differential pressure control is executed in the state where the steering angle is fixed.

Also, in a vehicle brake hydraulic pressure control apparatus, there may be the case where when the differential pressure control is executed while the vehicle is running on the split road, the differential pressure control is executed based on at least one of a detection value of the steering sensor and a detection value of the yaw rate sensor as described above. However, if the differential pressure becomes too large due to failure of those sensors, there is a possibility that the stability of the vehicle may be varied.

Then, a vehicle brake hydraulic pressure control apparatus may be provided that sets the control differential pressure based on at least one of the detection values of the steering angle sensor and the yaw rate sensor and that can ensure the stability of the vehicle even if at least one of the steering sensor and the yaw rate sensor brakes down.

(17) In the configuration of (6), the control differential pressure setting section may set the control differential pressure based on at least one of the steering angle detected by the steering angle sensor and the actual yaw rate detected by the yaw rate sensor.

With the configuration of (17), the positive amount of change of the control differential pressure with respect to time is equal to or less than the limit value set by the limit value setting section. Therefore, even if at least one of the yaw rate sensor and the steering sensor breaks down, it is possible to avoid that the control differential pressure increases sharply and to ensure the stability. Furthermore, if the control differential pressure set by the control differential pressure setting section is in the low differential pressure region after the time at which the first setting time elapses since the start of the differential pressure control, the upper limit value is set to be large. If the control differential pressure set by the control differential pressure setting section is in the high differential pressure region after the time at which the first setting time elapses since the start of the differential pressure control, the upper limit value is set to be small. Therefore, it is possible to ensure the braking performance even in the low differential pressure region in which the braking performance is largely affected. Also, it is possible to ensure the stability even in the high differential pressure region in which the stability is largely affected.

(18) In the configuration of (17), when the control differential pressure changes from the low differential pressure region to the high differential pressure region, the limit value setting section may change the upper limit value so that the upper limit value decreases gradually.

With the configuration of (18), when the control differential pressure changes from the low differential pressure region to the high differential pressure region, the upper limit value is changed so as to decrease gradually. Thereby, it is possible to smoothly switch between ensuring the braking performance in the low differential pressure region and ensuring the stability in the high differential pressure region.

(19) In the configuration of (17) or (18), the limit value setting section may set the upper limit value to be small as the velocity of the vehicle body increases.

With the configuration of (19), the upper limit value becomes small as the velocity of the vehicle body increases. Thereby, even if the upper limit value is set to be large, it is possible to prioritize ensuring the braking performance, by setting the upper limit value to be large, in a low vehicle velocity state in which the vehicle behavior less changes. Also, it is possible to prioritize ensuring the stability, by setting the upper limit value to be small, in a high vehicle velocity state in which the vehicle behavior changes largely if the upper limit value is set to be large.

BRIEF DESCRIPTION OF THE DRAWINGS

FIGS. 18A to 18C are diagrams illustrating a phenomenon produced when a yaw rate sensor fails so that an output thereof increases towards the higher coefficient-of-friction road side.

FIGS. 19A to 19C are diagrams illustrating an effect provided when the control differential pressure is set to be equal to or smaller than the first lower limit differential pressure.

FIGS. 24A to 24C are diagrams illustrating an effect provided when the upper limit value of the positive amount of change of the control differential pressure with respect to time is changed according to the control differential pressure.

DETAILED DESCRIPTION

Figure 1:
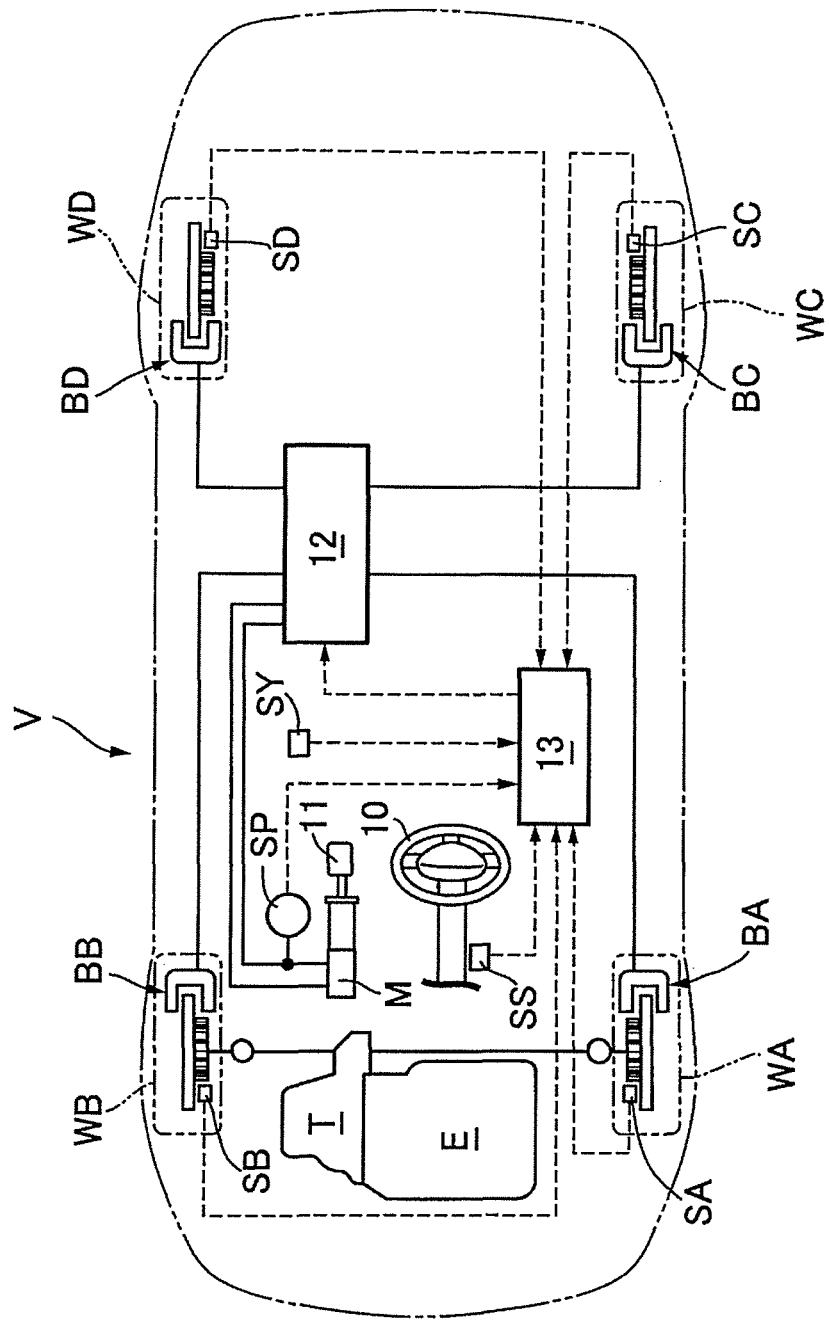
FIG. 1 is a diagram showing a vehicle brake hydraulic pressure control system.

Embodiments of the invention will be described with reference to FIGS. 1 to 24C. In FIG. 1, a vehicle V includes left and right front wheels WA, WB to which a driving force of an engine E is transmitted via a transmission T and left and right rear wheels WC, WD. A brake pedal 11 that is controlled by a driver is connected to a master cylinder M. Also, wheel brakes BA, BB, BC, BD, which operate by means of a brake fluid pressure, are provided on the front wheels WA, WB and the rear wheels WC, WD, respectively. The master cylinder M is connected to the respective wheel brakes BA to BD via a hydraulic pressure adjusting unit 12. This hydraulic pressure adjusting unit 12 can adjust (increase or decrease) individually brake fluid pressures that act on the wheel brakes BA to BD in order to prevent wheels from being locked when the brakes are applied.

The operation of the hydraulic pressure adjusting unit 12 is controlled by a hydraulic pressure control device 13. Signals from wheel speed sensors SA, SB, SC, SD which are provided individually for the left and right front wheels WA, WB and the left and right rear wheels WC, WD, a signal from a pressure sensor SP which detects a brake fluid pressure that is output from the master cylinder M, a signal from a steering angle sensor SS which detects a steering angle of a steering wheel 10, and a signal from a yaw rate sensor SY which detects a yaw rate of the vehicle are input to the hydraulic pressure control device 13. The hydraulic pressure control device 13 controls the operation of the hydraulic pressure adjusting unit 12 based on the signals from the sensors SA to SD, SP, SA, SY.

Figure 2:
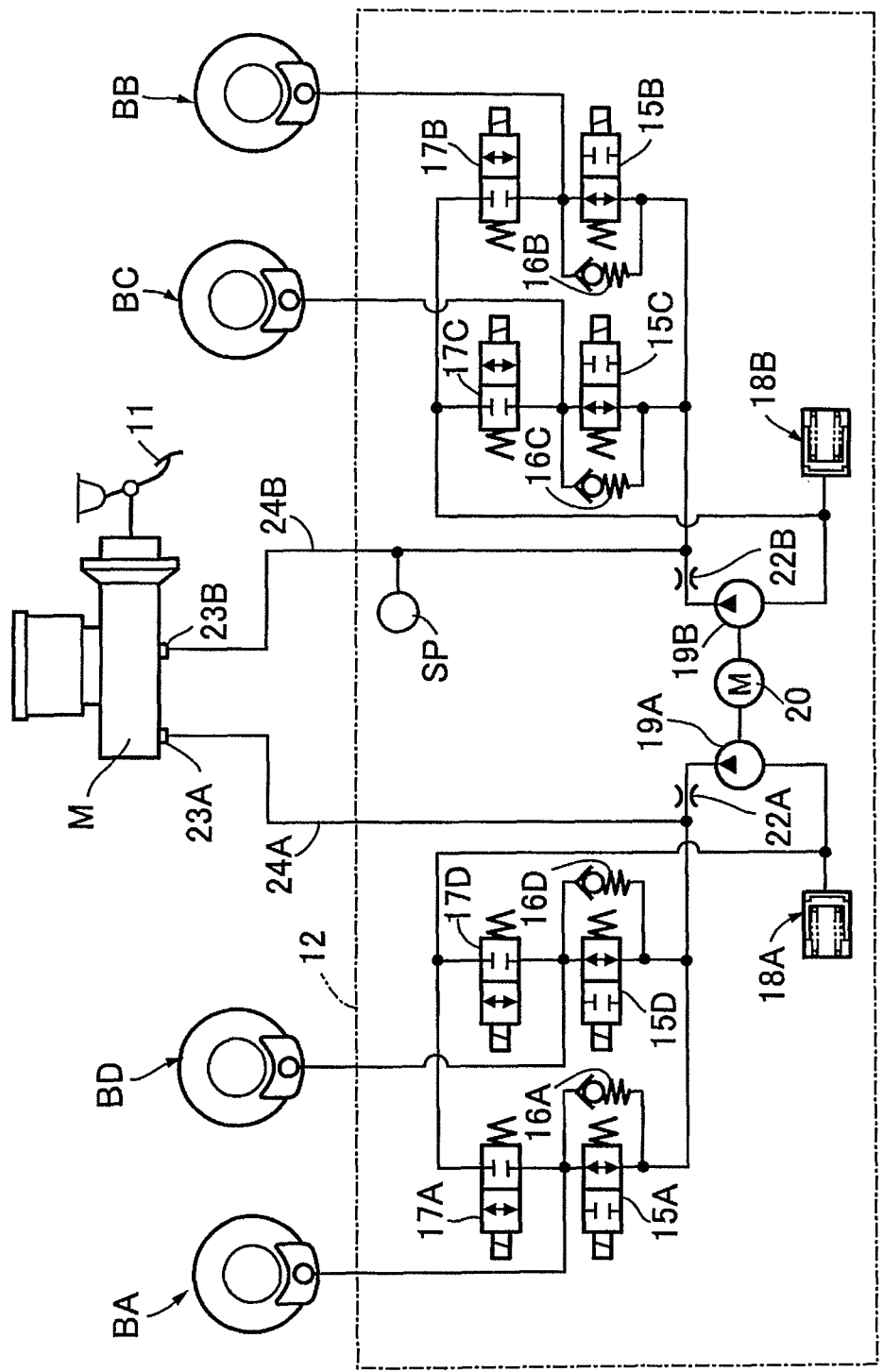
FIG. 2 is a hydraulic pressure circuit diagram showing the configuration of a hydraulic pressure adjusting unit.

In FIG. 2, the hydraulic pressure adjusting unit 12 includes normally open solenoid valves 15A to 15D, check valves 16A to 16D, normally closed solenoid valves 17A to 17D, a first reservoir 18A, a second reservoir 18B, first and second pumps 19A, 19B, an electric motor 20 and first and second orifices 22A, 22B. The normally open solenoid valves 15A to 15D correspond individually to the wheel brake BA for the left front wheel WA, the wheel brake BB for the right front wheel WB, the wheel brake BC for the left rear wheel WC and the wheel brake BD for the right rear wheel WD. The check valves 16A to 16D are respectively connected to the normally open solenoid valves 15A to 15D in parallel. The normally closed solenoid valves 17A to 17D correspond individually to the wheel brakes BA to BD. The first reservoir 18A corresponds to a first output hydraulic pressure line 24A which connects to a first output port 23A which is one of first and second output ports 23A, 23B provided in the master cylinder M. The second reservoir 18B corresponds to a second output hydraulic pressure line 24B which connects to the second output port 23B of the master cylinder M. Suction sides of the first and second pumps 19A, 19B are connected to the first and second reservoirs 18A, 18B, respectively. Discharge sides of the first and second pumps 19A, 19B are connected to the first and second output hydraulic pressure lines 24A, 24B, respectively. The electric motor is shared by the first and second pumps 19A, 19B and drives the first and second pumps 19A, 19B. The first and second orifices 22A, 22B are provided between the discharge sides of the first and second pumps 19A, 19B and the master cylinder M, respectively. The pressure sensor SP is provided in either of the first and second output hydraulic pressure lines 24A, 24B. In FIG. 2, for example, the pressure sensor SP is connected to the second output hydraulic pressure line 24B.

The normally open solenoid valves 15A, 15D are provided between the first output hydraulic pressure line 24A and the wheel brake BA for the left front wheel WA and the wheel brake BD for the right rear wheel WD, respectively. The normally open solenoid valves 15B, 15C are provided between the second output hydraulic pressure line 24B and the wheel brake BB for the right front wheel WB and the wheel brake BC for the left rear wheel WC, respectively.

Also, the check valves 16A to 16D are connected to the corresponding normally open solenoid valves 15A to 15D in parallel so as to permit brake fluid to flow from the corresponding wheel brakes BA to BD to the master cylinder M.

The normally closed solenoid valves 17A, 17D are provided between the wheel brake BA for the left front wheel WA and the wheel brake BD for the right rear wheel WD and the first reservoir 18A, respectively. The normally closed solenoid valves 17B, 17C are provided between the wheel brake BB for the right front wheel WB and the wheel brake BC for the left rear wheel WC and the second reservoir 18B, respectively.

The hydraulic pressure adjusting unit 12 that is configured as described above establishes communications between the master cylinder M and the wheel brakes BA to BD at the time of normal braking in which there is no possibility of the individual wheels being locked, while interrupting communications between the wheel brakes BA to BD and the first and second reservoirs 18A, 18B. Namely, the normally open solenoid valves 15A to 15D are deenergized to be opened, while the normally closed solenoid valves 17A to 17D are deenergized to be closed. A brake fluid pressure output from the first output port 23A of the master cylinder M acts the wheel brake BA for the left front wheel WA via the normally open solenoid valve 15A and also acts on the wheel brake. BD for the right rear wheel WD via the normally open solenoid valve 15D. Also, a brake fluid pressure output from the second output port 23A of the master cylinder M acts on the wheel brake BB for the right front wheel WB via the normally open solenoid valve 15B and also acts on the wheel brake BC of the left rear wheel BC via the normally open solenoid valve 15C.

When any of the wheels WA to WD is about to be locked during the normal braking, an anti-locking braking control is executed. Namely, the hydraulic pressure adjusting unit 12 interrupts the communications between the master cylinder M and the wheel brakes BA to BD in a portion which corresponds to the wheel which is about to be locked while establishing communications between the wheel brakes BA to BD and the reservoirs 18A, 18B. In other words, the normally open solenoid valve(s) of the normally open solenoid valves 15A to 15D which correspond to the wheel(s) which are about to be locked are energized to be closed, while the normally closed solenoid valve(s) of the normally closed solenoid valves 17A to 17D which correspond to the wheel(s) which are about to be locked are energized to be opened. Thereby, a part of the brake fluid pressure applied to the wheel brake for the wheel which is about to be locked is suctioned into the first reservoir 18A or the second reservoir 18B, and the brake fluid pressure applied to the wheel brake for the wheel, which is about to be locked, is reduced.

Also, when attempting to hold the brake fluid pressures to be constant, the hydraulic pressure adjusting unit 12 cuts off the wheel brakes BA to BD from the master cylinder M and the reservoirs 18A, 18B. Namely, the normally open solenoid valves 15A to 15D are energized to be closed, while the normally closed solenoid valves 17A to 17D are deenergized to be closed. Furthermore, when the brake fluid pressures are increased, the normally open solenoid valves 15A to 15D are deenergized to be opened, while the normally closed solenoid valves 17A to 17D are deenergized to remain closed.

In this way, by controlling the energizing/deenergizing of the normally open solenoid valves 15A to 15D and the normally closed solenoid valves 17A to 17D, the vehicle V can be braked efficiently while preventing any of the wheels from being locked.

Meanwhile, the electric motor 20 rotates during the antilocking braking control described above, and the first and second pumps 19A, 19B are driven as the electric motor 20 operates in that way. Therefore, the brake fluid suctioned into the first and second reservoirs 18A, 18B are suctioned into the first and second pumps 19A, 19B. Then, the brake fluid so suctioned is flown back to the first and second output hydraulic pressure lines 24A, 24B. By flowing back the brake fluid in this way, the brake fluid can be returned to the master cylinder M. Furthermore, the pulsation of discharge pressures of the first and second pumps 19A, 19B is suppressed by the action of the first and second orifices 22A, 22B. This prevents the operation feeling of the brake pedal 11 being deteriorated by the flowing back of brake fluid.

Figure 3:
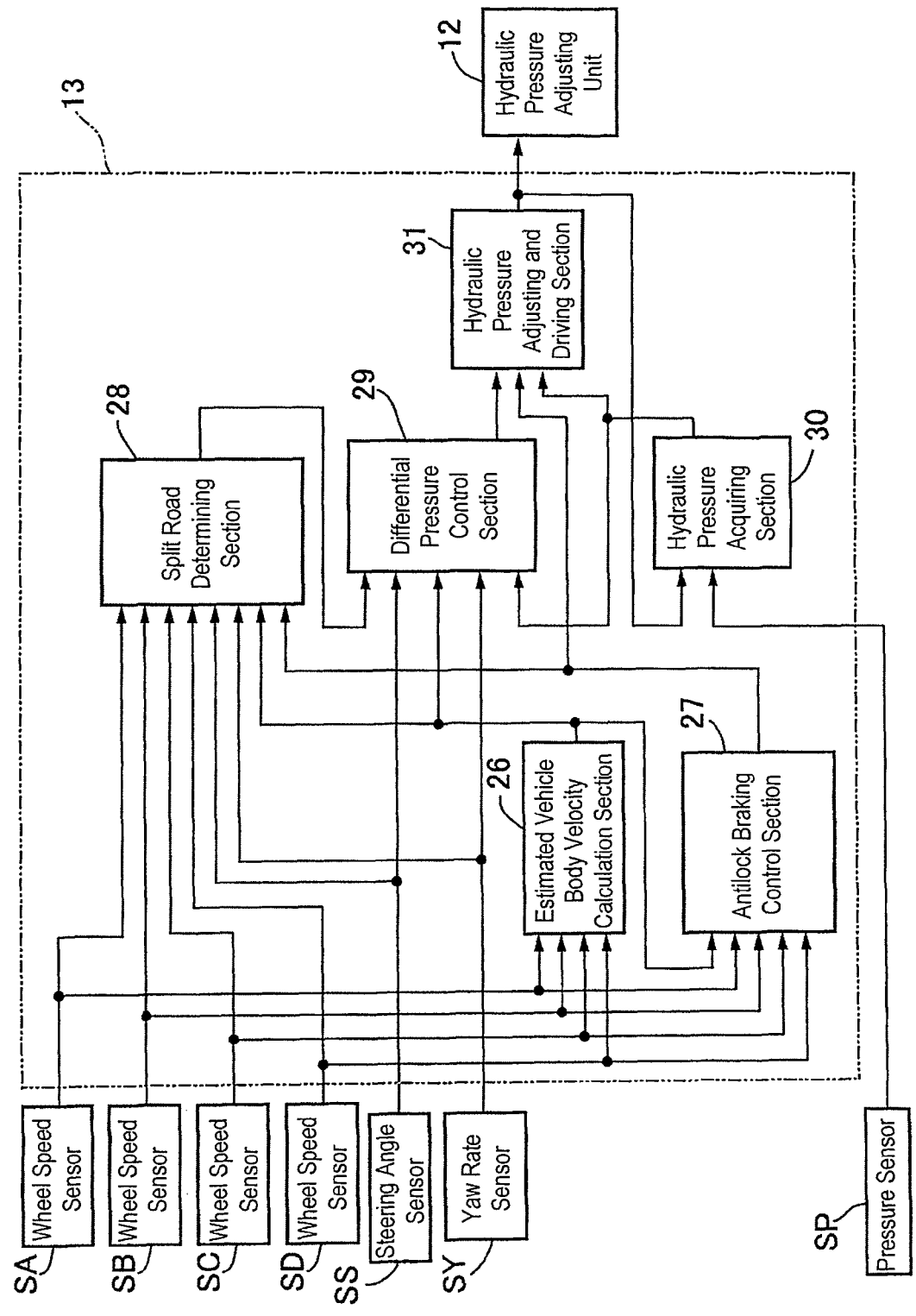
FIG. 3 is a block diagram showing the configuration of a vehicle brake hydraulic pressure control apparatus.
Figure 4:
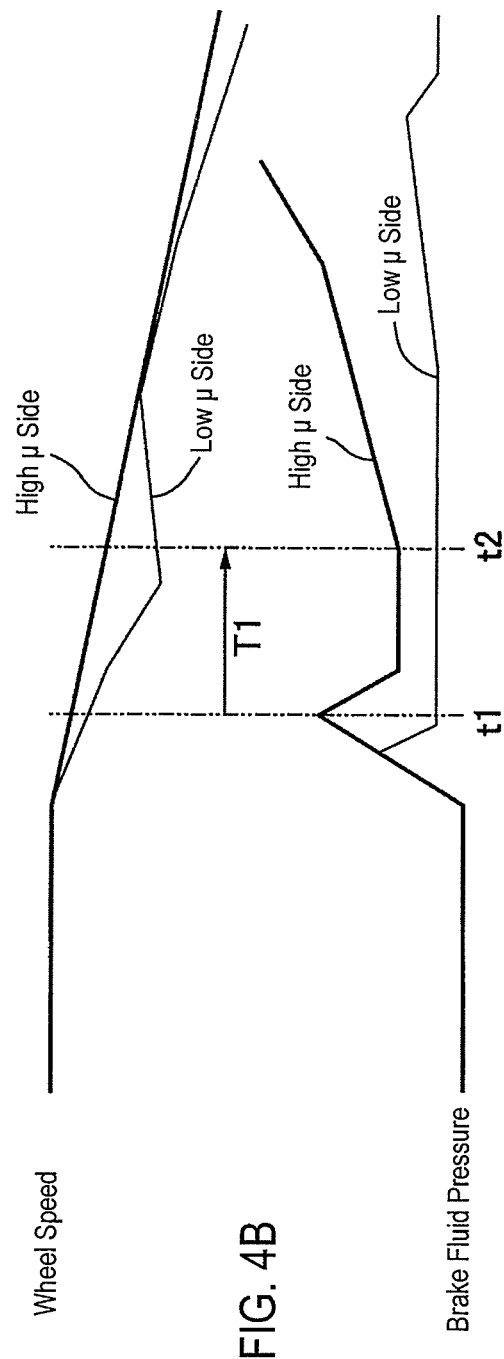
FIGS. 4A to 4B are diagrams showing changes with time of wheel speed and brake hydraulic pressure when a brake pedal is operated at slow speeds.
Figure 5:
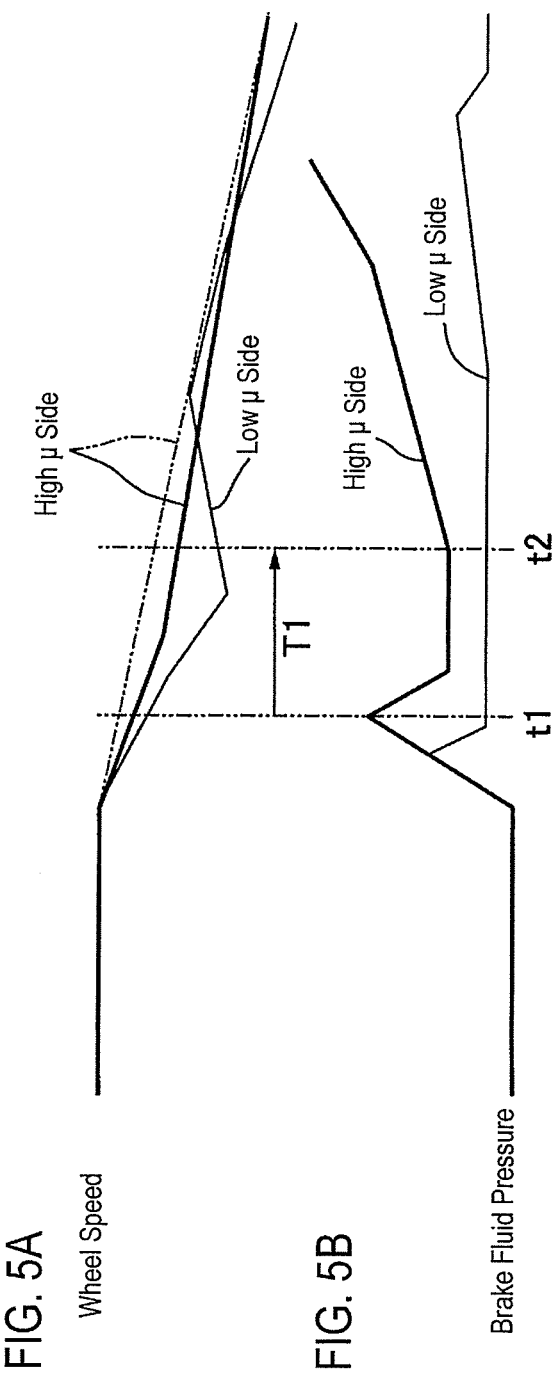
FIGS. 5A to 5B are diagrams showing changes with time of wheel speed and brake hydraulic pressure when the brake pedal is operated at fast speeds.

In FIG. 3, the hydraulic pressure control device 13, which controls the operation of the hydraulic pressure adjusting unit 12, executes the antilock braking control. Also, the hydraulic pressure control device 13 can execute a differential pressure control in which a difference in brake fluid pressure between the wheel brakes BA, BB for the left and right front wheels WA, WB and between the wheel brakes BC, BD for the left and right rear wheels WC, WD. The hydraulic pressure control device 13 includes an estimated vehicle body velocity calculation section 26 (which is an example of a vehicle body velocity acquiring section), an antilock braking control section 27, a split road determining section 28, a differential pressure control section 29, a hydraulic pressure acquiring section 30, and a hydraulic pressure adjusting and driving section 31. The antilock braking control section 27 determines as to whether or not an antilock braking control is to be executed. Also, the antilock braking control section 27 calculates a hydraulic pressure control amount when the antilock braking control is being executed. The split road determining section 28 determines as to whether or not a road on which the vehicle is running is a split road in which coefficients of friction of road surfaces with which the left and right wheels WA, WB; WC, WD of the vehicle are in contact are different from each other. The differential pressure control section 29 calculates hydraulic pressure control amounts for execution of the differential pressure control in which the differences in brake fluid pressure between the wheel brakes BA, BB for the left and right front wheels WA, WB which are coaxial with each other and between the wheel brakes BC, BD for the left and right rear wheels WC, WD which are also coaxial with each other are controlled. The hydraulic pressure acquiring section 30 acquires brake fluid pressures applied to the wheel brakes BA, BB for the front wheels WA, WB and the wheel brakes BC, BD for the rear wheels WC, WD. The hydraulic pressure adjusting and driving section 31 actuates the hydraulic pressure adjusting unit 12 according to the hydraulic pressure control amounts calculated by the differential pressure control section 29 to execute the differential pressure control.

The antilock braking control section 27 determines as to whether or not the antilock braking control is to be executed based on the wheel speeds acquired by the wheel speed sensors SA to SD and the estimated vehicle body velocity calculated by the estimated vehicle body velocity calculation section 26. Also, the antilock braking control section 27 calculates the hydraulic pressure control amount when the antilock braking control is executed.

When the antilock braking control section 27 starts the antilock braking control for any of the front wheels WA, WB and the rear wheels WC, WD, the split road determining section 28 determines as to whether or not the road surfaces with which the left and right front wheels WA, WB or the left and right rear wheels WC, WD are in contact constitute the split road. For example, when the antilock braking control is started for at least one of the left and right front wheels WA, WB or the antilock braking control is started for at least one of the left and right rear wheels WC, WD, in the event that a maximum value of wheel decelerations of the front wheels WA, WB and the rear wheels WC, WD is equal to or larger than a first predetermined value (that is, a wheel deceleration which is closest to zero is equal to or larger than the first predetermined value) and a difference in wheel deceleration between the left and right front wheels WA, WB or the left and right rear wheels WC, WD for either of which the antilock braking control is being executed is equal to or larger than a second predetermined value, the split road determining section 28 determines that the road surfaces with which the front wheels WA, WB or the rear wheels WC, WD are in contact constitute the split road.

The hydraulic pressure acquiring section 30 acquires the brake fluid pressures applied to the wheel brakes BA, BB for the front wheels WA, WB and the wheel brakes BC, BD for the rear wheels WC, WD based on the output hydraulic pressure from the master cylinder M and driving currents of the solenoid valves which make up part of the hydraulic pressure adjusting unit 12, that is, the normally open solenoid valves 15A to 15D and the normally closed solenoid valves 17A to 17D. The output hydraulic pressure from the master cylinder M is input into the hydraulic pressure acquiring section 30 from the pressure sensor SP. Also, a signal representing the driving currents of the normally open solenoid valves 15A to 15D and the normally closed solenoid valves 17A to 17D is input to the hydraulic pressure acquiring section 30 from the hydraulic pressure adjusting and driving section 31.

When the split road determining section 28 determines that the road surfaces with which the front wheels WA, WB or the rear wheels WC, WD are in contact constitute the split road, the hydraulic pressure control section 29 determines brake fluid pressures so that a difference in brake fluid pressure between the wheel brakes BA, BB; BC, BD of the left and right front wheels WA, WB and the left and right rear wheels WC, WD is equal to or smaller than the control differential pressure, based on the respective brake fluid pressures of the wheel brakes BA, BB, BC, BD which are acquired by the hydraulic pressure acquiring section 30, the vehicle body velocity calculated by the estimated vehicle body velocity calculation section 26, the detection value of the steering sensor SS, the detection value of the yaw rate sensor SY, and the brake fluid pressures of the wheel brakes BA, BB for the left and right front wheels WA, WB which are acquired by the hydraulic pressure acquiring section 30.

The hydraulic pressure adjusting and driving section 31 actuates the hydraulic pressure adjusting unit 12 based on the hydraulic pressure control amount calculated by the antilock braking control section 27, the brake fluid pressures determined by the differential pressure control section 29, and the brake fluid pressures of the wheel brakes BA, BB, BC, BD acquired by the hydraulic pressure acquiring section 30.

Meanwhile, the differential pressure control section 29 sets a control differential pressure so that the control differential pressures until a first setting time T1 elapses since the start of the differential pressure control is smaller than the control differential pressure after the first setting time T1 elapses. When the brake pedal 11 is operated at slow speeds, the wheel speed of the wheel on a high coefficient-of-friction road side (a high μ road side) and the wheel speed of the wheel on a low coefficient-of-friction road side (a low μ road side) change as shown in FIG. 4A, while the brake fluid pressure of the wheel on the high coefficient-of-friction road side (the high μ road side) and the brake fluid pressure of the wheel on the low coefficient-of-friction road side (the low μ road side) change as shown in FIG. 4B. The hydraulic pressure control is executed so that the differential pressure increases from a time t2 at which the first setting time T1 has elapsed since a time t1 at which the differential pressure control is started.

Also, when the brake pedal 11 is operated at high speeds, the wheel speed of the wheel on the high coefficient-of-friction road side (the high μ road side) and the wheel speed of the wheel on the low coefficient-of-friction road side (the low μ road side) change as shown in FIG. 5A, while the brake fluid pressure of the wheel on the high coefficient-of-friction road side (the high μ road side) and the brake fluid pressure of the wheel on the low coefficient-of-friction road side (the low μ road side) change as shown in FIG. 5B. The hydraulic pressure control is executed so that the differential pressure increases from the time t2 at which the first setting time T1 has elapsed since the time t1 at which the differential pressure control is started.

Namely, irrespective of the speeds at which the brake pedal 11 is operated, the differential pressure is made to increase at the timing at which the first setting time T1 has elapsed since the time t1 at which the differential pressure control is started. Consequently, the timings at which the differential pressure increases are the same, irrespective of the speeds at which the brake pedal 11 is operated.

Figure 6:
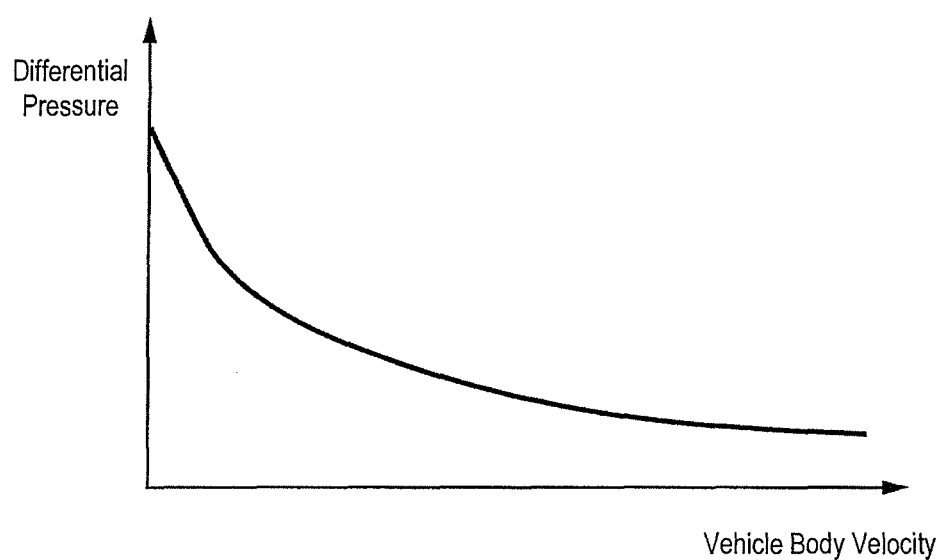
FIG. 6 is a diagram showing a map of a control differential pressure which changes according to a vehicle body velocity.

Furthermore, until the first setting time T1 elapses since the start of the differential pressure control, the differential pressure control section 29 determines the control differential pressure so that the control differential pressure increases as the vehicle body velocity acquired by the estimated vehicle body velocity calculation section 26 decreases. For example, a map as shown in FIG. 6 may be prepared in advance which defines the control differential pressure so that it changes according to the vehicle body velocity. The differential pressure control section 29 retrieves the control differential pressure until the first setting time T1 elapses since the start of the differential pressure control.

In this way, the operation of the hydraulic pressure adjusting unit 12 is controlled by setting the control differential pressure until the first setting time T1 elapses since the start of the differential pressure control to be smaller than the control differential pressure after the first setting time T1 elapses. Thereby, the control differential pressure increases at a point in time when the first setting time T1 elapses since the start of the differential pressure control while the differential pressure control is being carried out. Therefore, it is possible to determine the timing at which the control differential pressure increases based on the time that has elapsed since the start of the differential pressure control without depending upon the operation speed of the brake pedal 11. Accordingly, it is possible to realize the differential pressure control which is so stable that it can be prevented that the driver feels uncomfortable.

Also, the operation of the hydraulic pressure adjusting unit 12 is controlled based on the control differential pressure, which is determined so as to increase as the vehicle body velocity acquired by the estimated vehicle body velocity calculation section 26 decreases until the first setting time T1 elapses since the start of the differential pressure control. Thereby, the differential pressure control is executed based on the control differential pressure, which is determined according to the vehicle body velocity, in an initial stage of the differential pressure control which continues until the first setting time T1 elapses since the start of the differential pressure control. Thus, it is possible to eliminate the driver's uneasiness feeling and to ensure the stability in the initial state of the differential pressure control.

Furthermore, the control differential pressure until the first setting time T1 elapses since the start of the differential pressure control is retrieved based on the map in which the control differential pressure is preset according to the vehicle body velocity. Therefore, it becomes easy to set the control differential pressure.

Figure 7:
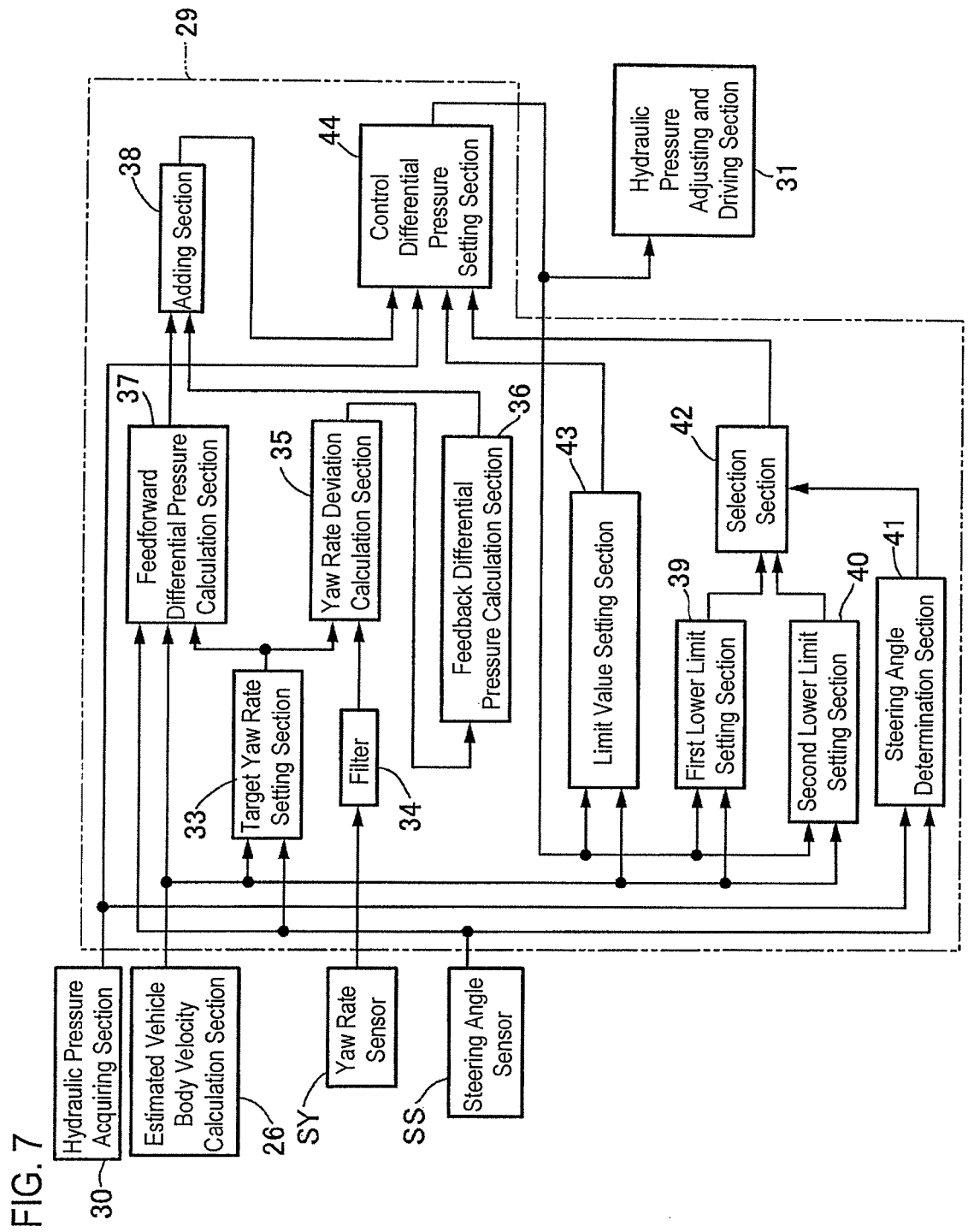
FIG. 7 is a block diagram showing the configuration of a differential pressure control section.
Figure 23A:
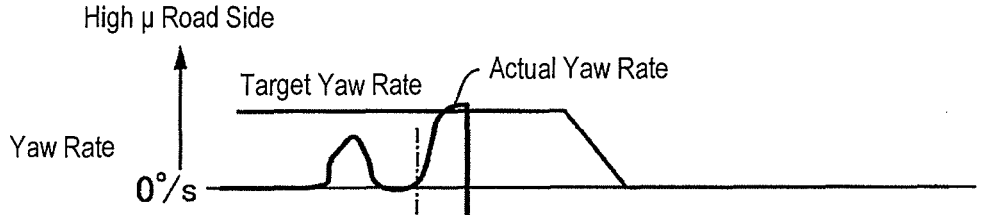
FIGS. 23A to 23C are diagrams illustrating an effect provided when a positive amount of change of the control differential pressure with respect to time is limited by its upper limit value.
Figure 23B:
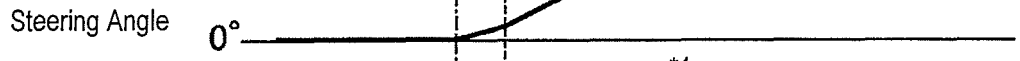
Figure 23C:
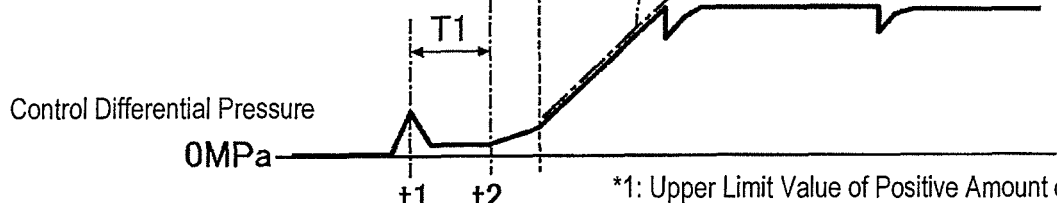

In order to realize the control differential pressure after the first setting time T1 elapses since the start of the differential pressure control, the differential pressure control section 29 has the configuration shown in FIG. 7. Namely, the differential pressure control section 29 includes a target yaw rate setting section 33, a filter 34, a yaw rate deviation calculation section 35, a feedback differential pressure calculation section 36, a feedforward differential pressure calculation section 37, an adding section 38, a first lower limit setting section 39, a second lower limit setting section 40, a steering angle determination section 41, a selection section 42, a limit value setting section 43, and a control differential pressure setting section 44. The target yaw rate setting section 33 sets a target yaw rate based on the steering angle detected by the steering angle sensor SS and the vehicle body velocity calculated by the estimated vehicle body velocity calculation section 26. The filter 34 performs a filter process for an actual yaw rate detected by the yaw rate sensor SY. The yaw rate deviation calculation section 35 calculates a yaw rate deviation which is a difference between the target yaw rate set by the target yaw rate setting section 33 and the actual yaw rate for which the filter 34 performs the filter process. The feedback differential pressure calculation section 36 executes a PI operation in accordance with the yaw rate deviation calculated by the yaw rate deviation calculation section 35 to calculate a feedback differential pressure between the brake fluid pressures of the wheel brakes for the left and right wheels so that the actual yaw rate approaches the target yaw rate. The feedforward differential pressure calculation section 37 acquires a feedforward differential pressure between the brake fluid pressures of the wheel brakes for the left and right wheels based on the steering angle detected by the steering sensor SS and the vehicle body velocity calculated by the estimated vehicle body velocity calculation section 26. The adding section 38 adds the feedforward differential pressure calculated by the feedforward differential pressure calculation section 37 to the feedback differential pressure calculated by the feedback differential pressure calculation section 36. The first lower limit setting section 39 sets a first lower limit differential pressure for use in the differential pressure control. The second lower limit setting section 40 sets a second lower limit differential pressure for use in the differential pressure control. The steering angle determination section 41 determines as to whether or not the steering angle is in a fixed state. The selection section 42 selects either of the first lower limit differential pressure and the second lower limit differential pressure which are set by the first and second lower limit setting sections 39, 40, respectively, according to the determination result by the steering angle determination section 41. The limit value setting section 43 sets an upper limit value for a positive amount of change of the control differential pressure with respect to time during the differential pressure control. Here, an example of an amount of change of the control differential pressure with respect to time includes an amount of change of the control differential pressure per unit time and a time differential of the control differential pressure. More specifically, as shown in FIGS. 23C, 24C, the limit value setting section 43 sets an upper limit (an upper limit value) of a positive inclination in a graph in which an axis of ordinates represents a control differential pressure while an axis of abscissas represents time. The control differential pressure setting section 44 sets a control differential pressure between the brake fluid pressures of the wheel brakes for the left and right wheels based on the brake fluid pressures of the wheel brakes BA, BB, BC, BD which are acquired at the hydraulic pressure acquiring section 30, the value acquired at the adding section 38, the one of the first lower limit differential pressure and the second lower limit differential pressure which is selected by the selection section 42, and the limit value set by the limit value setting section 43. The hydraulic pressure adjusting and driving section 31 drives the hydraulic pressure adjusting unit 12 according to the control differential pressure set by the control differential pressure setting section 44.

Figure 8:
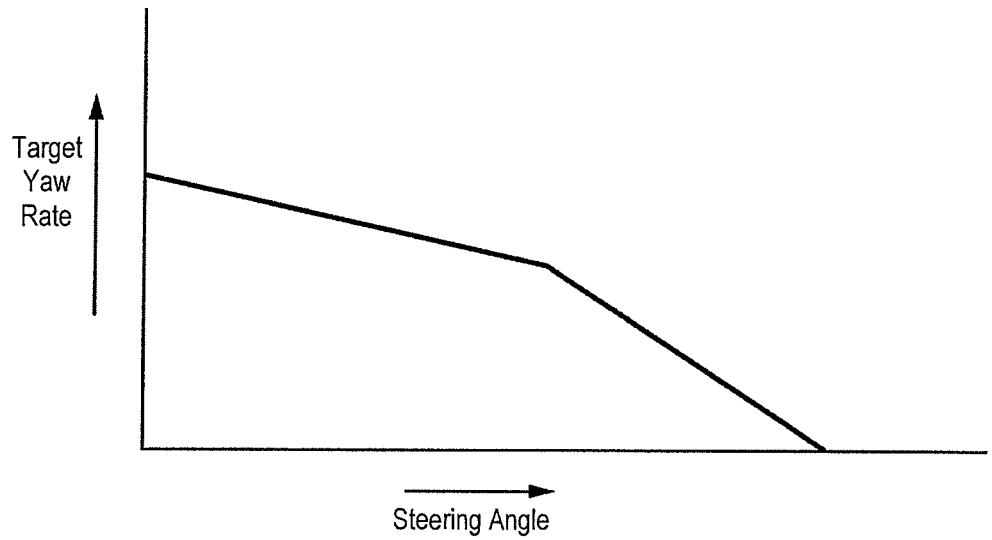
FIG. 8 is a diagram showing a change in target yaw rate according to a steering angle.

The target yaw rate setting section 33 sets the target yaw rate based on the steering angle and the vehicle body velocity so that the vehicle V is turned slightly to the high coefficient-of-friction road side to such an extent that the stability of the vehicle V is not affected. Furthermore, as shown in FIG. 8, the target yaw rate setting section 33 sets the target yaw rate so as to decrease as the steering angle increases.

Figure 9A:
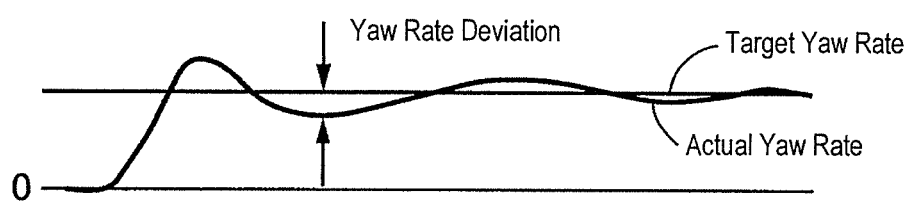
FIGS. 9A to 9C are diagrams showing an example of a P term and an I term in a feedback operation based on a target yaw rate and an actual yaw rate.
Figure 9B:
Figure 9C:
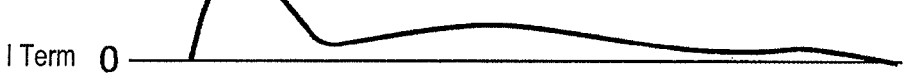

The feedback differential pressure calculation section 36 calculates the feedback differential pressure by which the actual yaw rate is caused to approach the target yaw rate, by adding a P term (=a P term coefficient×a yaw rate deviation) and an I term (=an I term coefficient×a yaw rate deviation+a previous value of yaw rate deviation). When the target yaw rate and the actual yaw rate change as shown in FIG. 9A, the feedback differential pressure calculation section 36 can calculate the P term as shown in FIG. 9B and can calculate the I term as shown in FIG. 9C.

The feedforward differential pressure calculation section 37 acquires the feedforward differential pressure between the brake fluid pressures of the wheel brakes for the left and right wheels, by adding a differential pressure based on the vehicle body velocity calculated by the estimated vehicle body velocity calculation section 26 and the target yaw rate set by the target yaw rate setting section 33 to a differential pressure based on the steering angle detected by the steering angle sensor SS.

Figure 10:
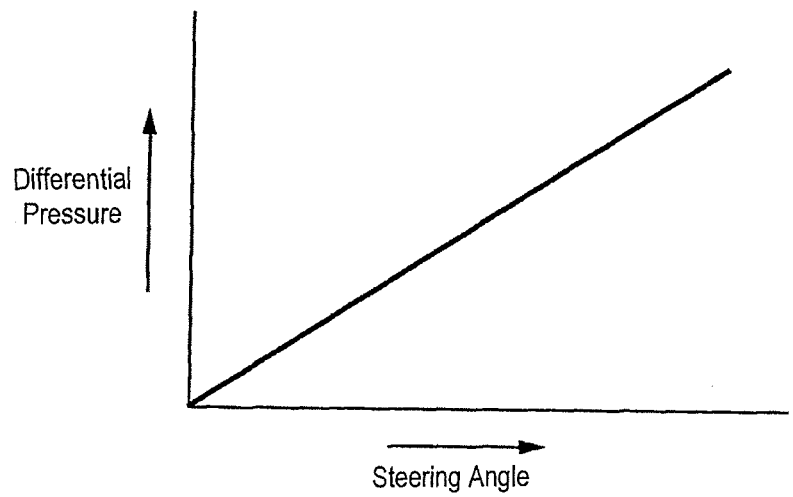
FIG. 10 is a diagram showing a relationship between a differential pressure and a steering angle when a vehicle is steered so as to be brought in a straight traveling state.

Then, when the steering wheel 10 is turned to bring the vehicle V to be in a straight traveling state with a differential pressure between brake fluid pressures of the brake wheels for the left and right wheels being set, the differential pressure and the steering angle are put in a relationship as shown in FIG. 10. The relationship between steering angle and differential pressure as shown in FIG. 10 is acquired in advance for each vehicle. Thereby, it is possible to acquire a differential pressure based on a steering angle at which the actual yaw rate becomes "0".

Figure 11:
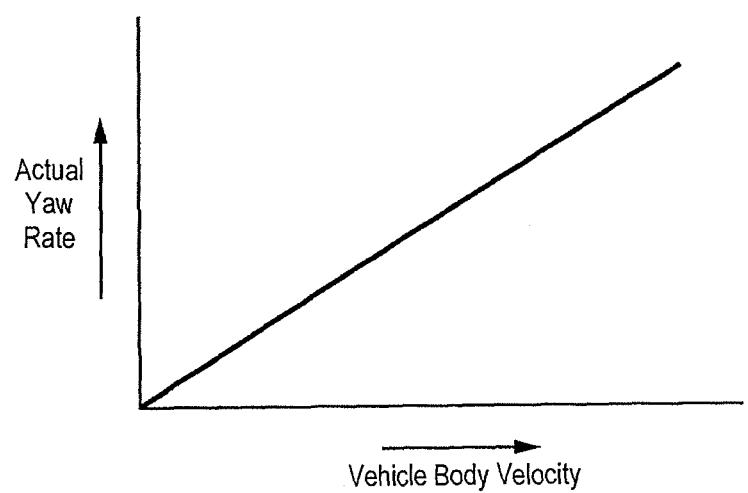
FIG. 11 is a diagram showing a relationship between the vehicle body velocity and the actual yaw rate in such a state that a differential pressure between brake hydraulic pressures of left and right wheel brakes is held to a predetermined value.

Also, when the vehicle V is driven in such a state that the differential pressure between brake fluid pressures of the wheel brakes for the left and right wheels is held to be a predetermined value, the vehicle body velocity and the differential pressure are put in a relationship shown in FIG. 11. Namely, the actual yaw rate is acquired by multiplying the vehicle body velocity by a proportional constant which depends upon the differential pressure between brake fluid pressures of the wheel brakes for the left and right wheels. Therefore, it is possible to acquire the proportional constant by (the target yaw rate/the vehicle body velocity). Then, the differential pressure can be retrieved from the proportional constant.

Figure 12A:
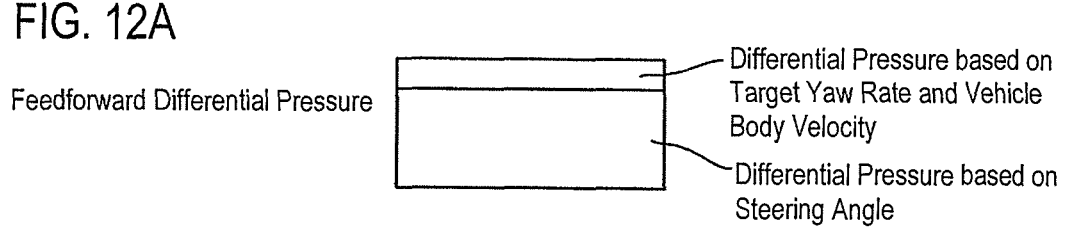
FIGS. 12A to 12C are diagrams illustrating an operation in an adding section in a conceptional fashion.
Figure 12B:
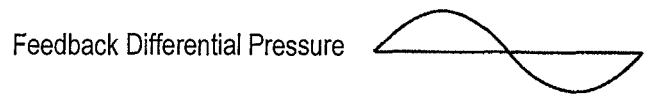
Figure 12C:
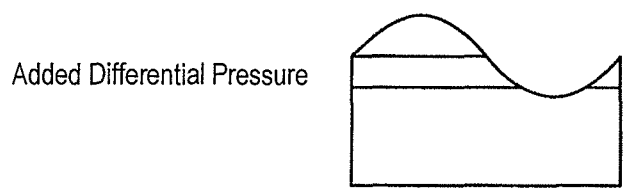

The adding section 38 adds the feedforward differential pressure calculated by the feedforward differential pressure calculation section 37 and the feedback differential pressure calculated by the feedback differential pressure calculation section 36. The feedforward differential pressure, which results from adding the differential pressure based on the steering angle to the target differential pressure based on the vehicle body velocity as shown in FIG. 12A, is output from the feedforward differential pressure calculation section 37. The feedback differential pressure as shown in FIG. 12B is output from the feedback differential pressure calculation section 36. Therefore, a differential pressure as shown in FIG. 12C is output from the adding section 38.

Figure 13:
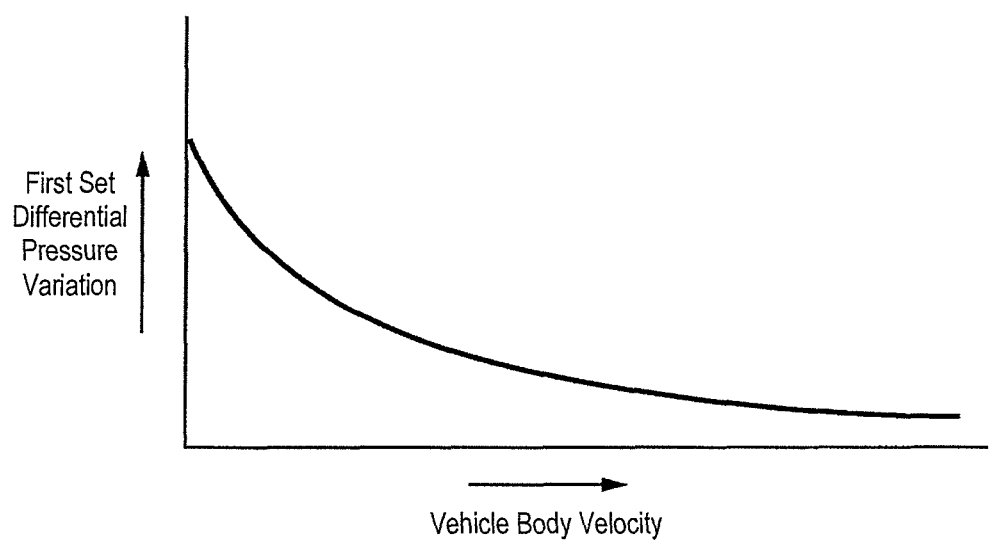
FIG. 13 shows an amount of change of a first lower limit differential pressure according to the vehicle body velocity.

The first lower limit setting section 39 adds sequentially on a cycle of calculation first set differential pressure variations with using, as a reference value, the control differential pressure which is set by the control differential pressure setting section 44 at the time t2 (see FIGS. 4A to 5B) at which the first setting time T elapses since the start of the differential pressure control. Thereby, the first lower limit setting section 39 sets the first lower limit differential pressure so as to increase as time elapses from the time t2. Furthermore, the first set differential pressure variations are set so as to decrease as the vehicle body velocity acquired by the estimated vehicle body velocity calculation section 26 increases as shown in FIG. 13. Therefore, the first lower limit setting section 39 sets the first lower limit differential pressure so as to change based on the variation according to the vehicle body velocity.

The second lower limit setting section 40 adds sequentially on a cycle of calculation second set differential pressure variations with using, as a reference value, the control differential pressure which is set by the control differential pressure setting section 44 at the time t2 (see FIGS. 4A to 5B) at which the first setting time T elapses since the start of the differential pressure control. Thereby, the second lower limit setting section 40 sets the second lower limit differential pressure so as to increase as time elapses from the time t2. Furthermore, the second set differential pressure variations are set so as not only to decrease as the vehicle body velocity acquired by the estimated vehicle body velocity calculation section 26 increases as with the set differential value variation set by the first lower limit setting section 39 but also to be smaller than the set differential pressure variation set by the first lower limit setting section 39. Therefore, the second lower limit setting section 40 sets the second lower limit differential pressure so as not only to change more moderately than the first lower limit differential pressure but also to change based on the variation according to the vehicle body velocity.

Figure 14:
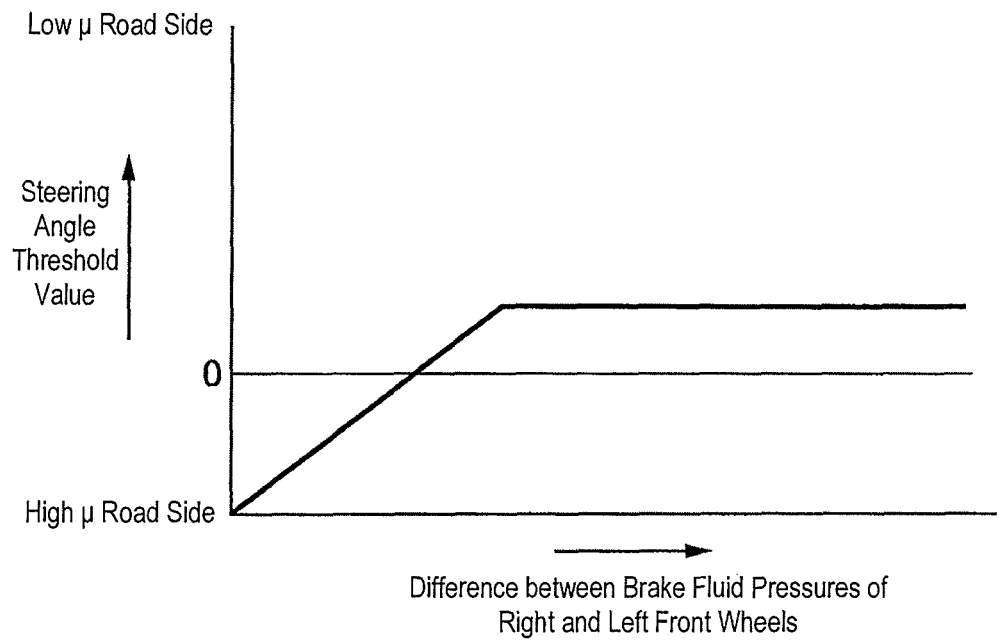
FIG. 14 is a diagram showing a relationship between a steering angle threshold value and a difference between brake hydraulic pressures of left and right front wheels.

If the steering angle continues to be lower than a steering angle threshold value, which is determined according to the difference in brake fluid pressure between the wheel brakes BA, BB for the left and right front wheels WA, WB that are acquired by the hydraulic pressure acquiring section 30, over a second setting time, the steering angle determination section 41 determines that the steering angle is in the fixed state. The steering angle threshold value is set according to the difference in brake fluid pressure between the wheel brakes BA, BB for the left and right front wheels WA, WB as shown in FIG. 14.

When the steering angle determination section 41 determines that the steering angle is in the fixed state, the selection section 42 selects the second lower limit differential pressure, which is set by the second lower limit setting section 40. To the contrary, when the steering angle determination section 41 determines that the steering angle is not in the fixed state, the selection section 42 selects the first lower limit differential pressure, which is set by the first lower limit setting section 39. Then, the selection section 42 inputs the first lower limit differential pressure or the second lower limit differential pressure, which is selected, to the control differential pressure setting section 44.

Figure 15:
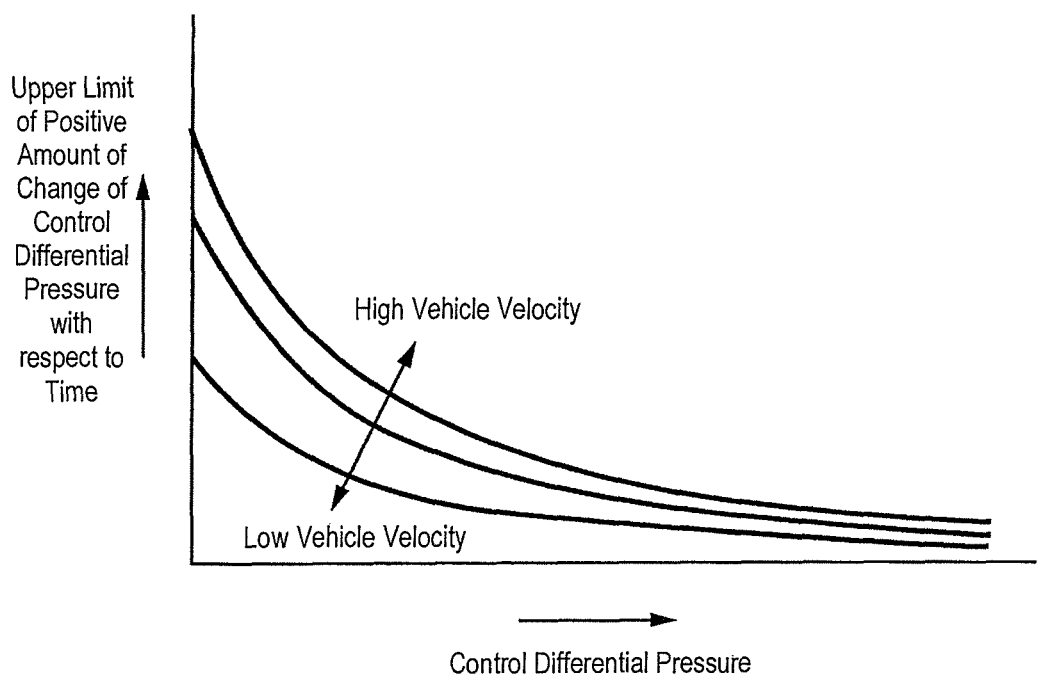
FIG. 15 is a diagram showing a relationship among an upper limit value of a positive amount of change of a control differential pressure with respect to time, left and right brake hydraulic pressures, and the vehicle body velocity.

When the control differential pressure set by the control differential pressure setting section 44 is small (when the control differential pressure is in a low differential pressure region) after the time t2 at which the first setting time T1 elapses since the start of the differential pressure control, the limit value setting section 43 sets the upper limit value of the positive amount of change of the control differential pressure with respect to time to be large. To the contrary, when the control differential pressure set by the control differential pressure setting section 44 is large (when the control differential pressure is in a high differential pressure region) after the time t2 at which the first setting time T1 elapses since the start of the differential pressure control, the limit value setting section 43 sets the upper limit value of the positive amount of change of the control differential pressure with respect to time to be small. That is, the limit value setting section 43 sets the upper limit value of the positive amount of change of the control differential pressure with respect to time according to the control differential pressure. Also, the limit value setting section 43 changes the upper limit value of the positive amount of change of the control differential pressure with respect to time so as to decrease gradually when the control differential pressure changes from the low differential pressure region to the high differential pressure region. Furthermore, the limit value setting section 43 sets the upper limit value of the positive amount of change of the control differential pressure with respect to time so as to decrease as the vehicle body velocity acquired by the estimated vehicle body velocity calculation section 26 increases. Thereby, the upper limit value of the positive amount of change of the control differential pressure with respect to time changes as shown in FIG. 15 according to the control differential pressure set by the control differential pressure setting section 44 and the vehicle body velocity acquired by the estimated vehicle body velocity calculation section 26.

Next, the operation of this embodiment will be described. The feedback differential pressure calculation section 36 executes the PI operation according to the yaw rate deviation to calculate the feedback differential pressure between the brake fluid pressures of the wheel brakes for the left and right wheels. The feedforward differential pressure calculation section 37 adds the differential pressure based on the vehicle body velocity and the target yaw rate to the differential pressure based on the steering angle to calculate the feedforward differential pressure between the brake fluid pressures of the wheel brakes for the left and right wheels. The control differential pressure setting section 44 determines the control differential pressure between the brake fluid pressures of the wheel brakes for the left and right wheels based on the value acquired by adding the feedforward differential pressure to the feedback differential pressure after the first setting time T1 elapses since the start of the differential pressure control and then drives the hydraulic pressure adjusting unit 31 according to the control differential pressure so determined. This enables the steering angle caused by the driver's steering operation to be balanced with the difference between the brake fluid pressures of the wheel brakes for the left and right wheels. Thereby, it is possible to prevent that the vehicle is slid laterally and that the stability of the vehicle is varied due to the difference in the steering operation.

Furthermore, the target yaw rate setting section 33 sets the target yaw rate based on the steering angle and the vehicle body velocity, to the value at which the vehicle V is turned to the high coefficient-of-friction road side. Therefore, the driver steers the vehicle so as to suppress the vehicle from turning to the direction oriented by the target yaw rate. Accordingly, it is possible to further increase the control differential pressure between the brake fluid pressures of the wheel brakes for the left and right wheels so as to ensure a sufficient braking force.

Figure 16A:
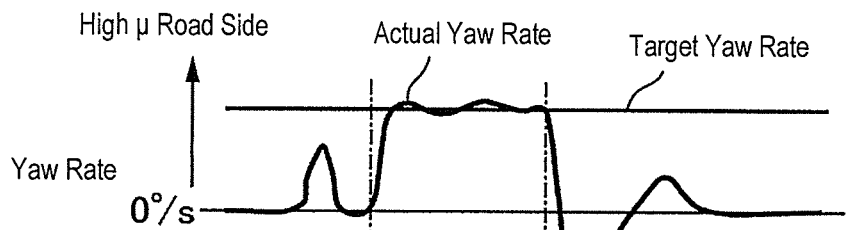
FIGS. 16A to 16C are diagrams illustrating a phenomenon produced when a target yaw rate is set to a constant value at which a vehicle is turned to a higher coefficient-of-friction road side.
Figure 16B:
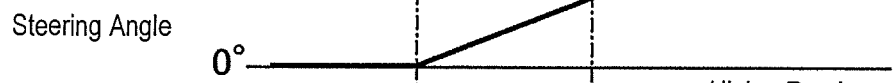
Figure 16C:
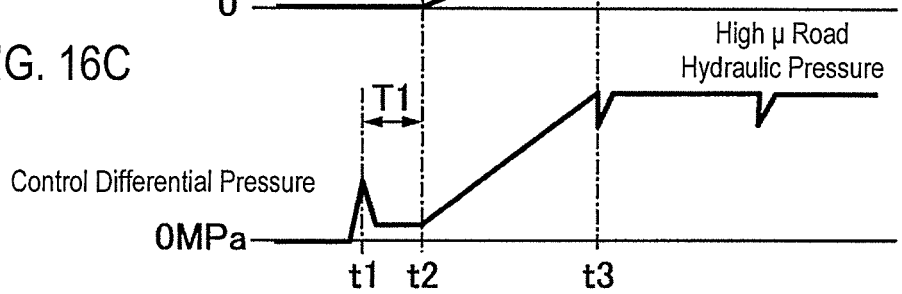

If the target yaw rate is set by the target yaw rate setting section 33 to the constant value at which the vehicle V is turned slightly to the high coefficient-of-friction road side, as shown in FIGS. 16A to 16C, the control differential pressure increases after the time t2 at which the first setting time T1 elapses since the time t1 at which the differential pressure control is started. However, if the target yaw rate is constant, when the brake fluid pressure of the wheel brake for the wheel on the high coefficient-of-friction road side enters an antilock braking control region at a time t3 at which the control differential pressure increases sufficiently, the control differential pressure stops increasing while the wheel is being steered at a constant steering speed. Thereby, the balance between the steering angle and the control differential pressure is lost, and the vehicle body V is slid laterally to the low coefficient-of-friction road side.

Figure 17A:
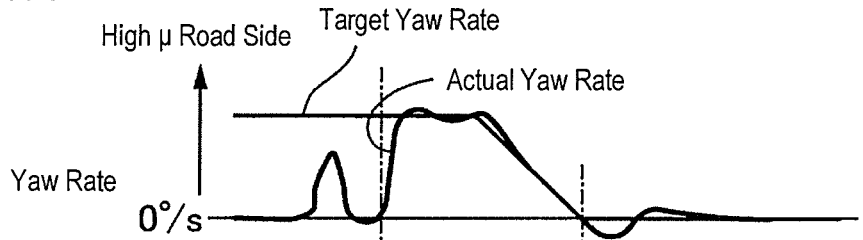
FIGS. 17A to 17C are diagrams illustrating an effect provided by changing the target yaw rate according to the steering angle.
Figure 17B:
Figure 17C:
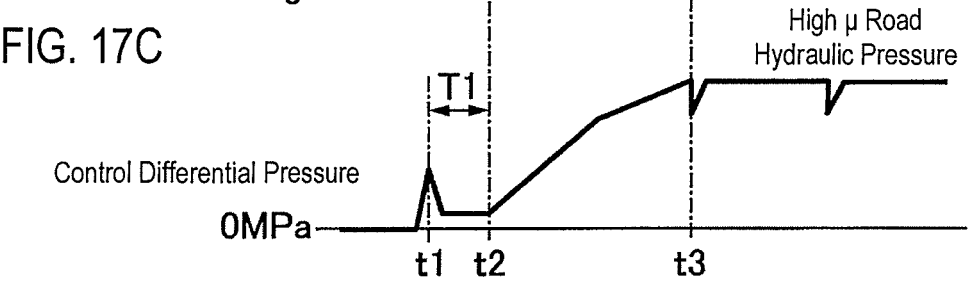

Therefore, the target yaw rate setting section 33 sets the target yaw rate so as to decrease as the steering angle increases. Therefore, even if the control differential pressure is increased sufficiently and the antilock braking control is started for the wheel brake of the wheel on the high coefficient-of-friction road side, the steering speed is small because the target yaw rate is small immediately before the start of the antilock braking control as shown in FIGS. 17A to 17C. Therefore, there is no such situation that the balance between the steering angle and the differential pressure is deteriorated largely during the antilock braking control, and it is possible to suppress the vehicle V from being slid laterally to the low coefficient-of-friction road side.

FIGS. 18A to 18C show changes in steering angle and control differential pressure when the yaw rate sensor SY fails so that the output of the yaw rate sensor SY indicates a large value on the high coefficient-of-friction road side after the time t2 at which the first setting time T1 elapses since the start of the differential pressure control. When the yaw rate sensor SY fails, it becomes difficult to acquire an appropriate control differential pressure, which might result in that a braking force is reduced. In this embodiment, however, the following operations will be executed. That is, the first lower limit setting section 39 sets the first lower limit differential pressure, which changes by an amount of change corresponding to the vehicle body velocity acquired by the vehicle body velocity acquiring section 26, based on the control differential pressure set by the control differential pressure setting section 44 after the time t2 at which the first setting time T1 elapses since the start of the differential pressure control. Here, a situation in which the steering angle is below the steering angle threshold value does not continue over the second setting time, and the steering angle determination section 41 determines that the steering angle is not in the fixed state. In this case, the selection section 42 selects the first lower limit hydraulic pressure, which is set by the first lower limit setting section 39. Then, the control differential pressure setting section 44 sets as the control differential pressure larger one of the value acquired by the adding section 38 and the first lower limit differential pressure set by the first lower limit setting section 39. The control differential pressure setting section 44 sets the first lower limit differential pressure to the minimum value after the first setting time T1 elapses since the start of the differential pressure control. As shown in FIGS. 19A to 19C, it is possible to set the control differential pressure so as to increase at a constant gradient which is determined by the first lower differential pressure, irrespective of the failure of the yaw rate sensor SY, thereby making it possible to ensure the minimum control differential pressure. As a result, it becomes possible to prevent a reduction in braking force. This will also be true when the steering angle sensor SS fails. Even if at least one of the yaw rate sensor SY and the steering angle sensor SS fails, it is possible to ensure the minimum control differential pressure. This can prevent a reduction in braking force.

Figure 20A:
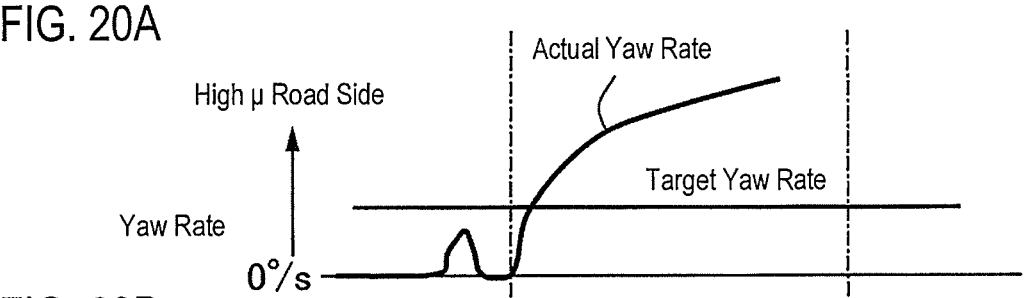
FIGS. 20A to 20C are diagrams illustrating a phenomenon produced when the control differential pressure is set to be equal to or larger than the first lower limit differential pressure with the steering angle remaining in a constant state.
Figure 20B:
Figure 20C:
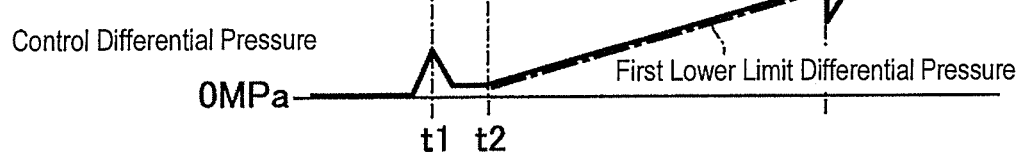

It is assumed that when at least one of the yaw rate sensor SY and the steering angle sensor SS fails, the first lower limit differential pressure is set to the minimum value and the steering angle is in a constant state in which it is close to "0" as shown in FIGS. 20A to 20C. In this case, when the hydraulic pressure adjusting unit 12 is actuated so as to produce the control differential pressure (the first lower limit differential pressure), a moment produced by the control differential pressure exceeds a moment produced by the steering angle, which might result in that the actual yaw rate becomes unstable. In this embodiment, however, the following operations will be executed. The second lower limit setting section 40 sets the second lower limit differential pressure, which changes by an amount of change corresponding to the vehicle body velocity acquired by the vehicle body velocity acquiring section 26 and which changes more moderately than the first lower limit differential pressure, based on the control differential pressure set by the control differential pressure setting section 44 after the time t2 at which the first setting time T1 elapses since the start of the differential pressure control. The steering angle determination section 41 confirms that a situation in which the steering angle is below the steering angle threshold value which is determined according to the difference between the brake fluid pressures of the wheel brakes BA, BB for the left and right front wheels WA, WB which are acquired by the hydraulic pressure acquiring section 30 continues over the second setting time T2 and then determines that the steering angle is in the fixed state. Then, the selection section 42 selects the second lower limit differential pressure in place of the first lower limit differential pressure in such a state that the steering angle is fixed and then inputs it to the control differential pressure setting section 44. In the state where the steering angle is fixed, the control differential pressure setting section 44 sets as the control differential pressure larger one of the value acquired by the adding section 38 and the second lower limit differential pressure and sets the second lower limit differential pressure to the minimum value. Thereby, the stability of the yaw rate is ensured.

Figure 21A:
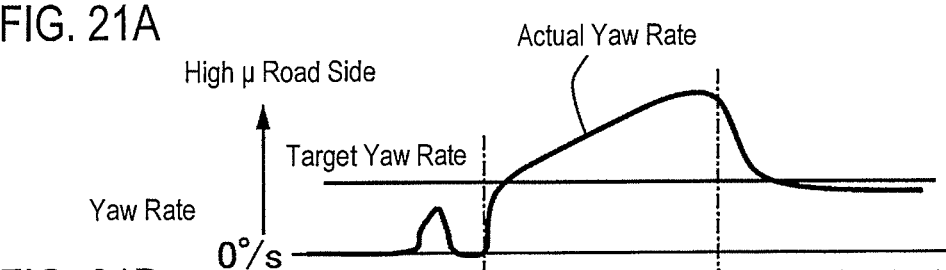
FIGS. 21A to 21C are diagrams illustrating an effect provided when the control differential pressure is set so that a minimum value thereof is a second lower limit value with the steering angle fixed.
Figure 21B:
Figure 21C:
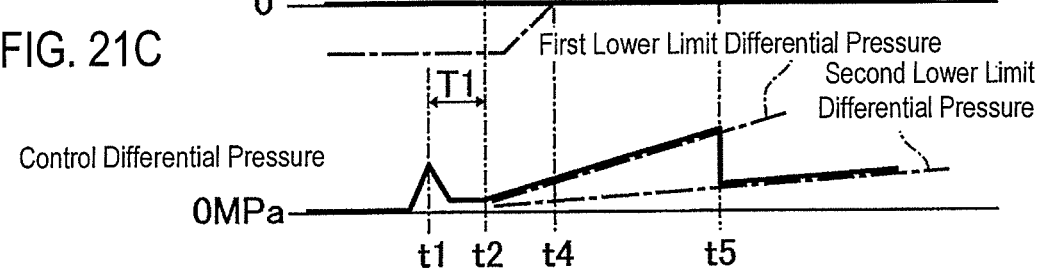

That is, as shown in FIGS. 21A to 21C, the first lower limit differential pressure is set to the minimum value after the time t2 at which the first setting time T1 elapses since the time t1. However, the second lower limit differential pressure is selected in place of the first lower limit differential pressure at a time t5 at which the second setting time T2 elapses since a time t4 at which the steering angle is below the steering angle threshold value. Then, the second lower limit differential pressure is set to the minimum value after the time t5. The second lower limit differential pressure changes with time moderately, and the actual yaw rate approaches the target yaw rate, whereby the stability of the vehicle body V is ensured.

Figure 22A:
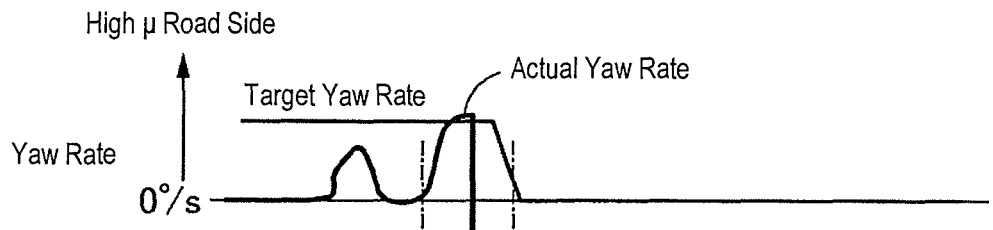
FIGS. 22A to 22C are diagrams illustrating a phenomenon produced when the yaw rate sensor fails so that the output thereof increases towards a lower coefficient-of-friction road side.
Figure 22B:
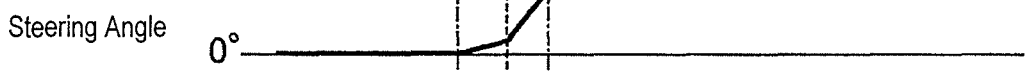
Figure 22C:
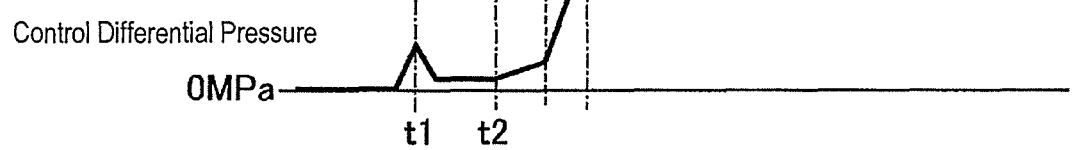

FIGS. 22A to 22C show changes in steering angle and control differential pressure when the yaw rate sensor SY fails so that the output of the yaw rate sensor SY indicates a larger value on the low coefficient-of-friction road side after the time t2 at which the first setting time T1 elapses since the start of the differential pressure control. In this case, the control differential pressure increases abruptly and drastically, which might result in that stability of the vehicle body V is deteriorated. In this embodiment, however, the following operations will be executed. The limit value setting section 43 sets the upper limit value of the positive amount of change of the control differential pressure with respect to time. The control differential pressure setting section 44 sets the control differential pressure so that the control differential pressure changes by an amount of change which is equal to or smaller than the upper limit value of the positive amount of change of the control differential pressure with respect to time, which is set by the limit value setting section 43. This can void abrupt and drastic increase of the control differential pressure even if the yaw rate sensor SY fails, as shown in FIGS. 23A to 23C, thereby making it possible to ensure the stability of the vehicle V.

This will also be true when the steering sensor SS fails. Even if at least one of the yaw rate sensor SY and the steering angle sensor SS fails, the abrupt and drastic increase of the control differential pressure can be avoided, thereby making it possible to ensure the stability of the vehicle V.

Meanwhile, if the upper limit value of the positive amount of change of the control differential pressure with respect to time is set to be constant, either of stability and braking performance might be sacrificed depending upon control differential pressures. Taking this viewpoint into consideration, when the control differential pressure set by the control differential pressure setting section 44 is small (the control differential pressure is in the low differential pressure region), the limit value setting section 43 sets the upper limit value of the positive amount of change of the control differential pressure with respect to time to be large after the time t2 at which the first setting time T1 elapses since the start of the differential pressure control. To the contrary, when the control differential pressure set by the control differential pressure setting section 44 is large (the control differential pressure is in the high differential pressure region), the limit value setting section 43 sets the upper limit value of the positive amount of change of the control differential pressure with respect to time to be small after the time t2 at which the first setting time T1 elapses since the start of the differential pressure control. That is, the control differential pressure setting section sets the upper limit value of the positive amount of change of the control differential pressure with respect to time according to the control differential pressure. Furthermore, the control differential pressure setting section 44 changes the upper limit value of the positive amount of change of the control differential pressure with respect to time so as to decrease gradually when the control differential pressure changes from the low differential pressure region to the high differential pressure region.

That is, as shown in FIGS. 24A to 24C, when at least one of the yaw rate sensor SY and the steering sensor SS fails to thereby increase the control differential pressure, the control differential pressure changes based on the large upper limit value (the upper limit value of the positive amount of change of the control differential pressure with respect to time) in the low differential pressure region, while the control differential pressure changes based on the small upper limit value (the upper limit value of the positive amount of change of the control differential pressure with respect to time) in the high differential pressure region. The upper limit value of the positive amount of change of the control differential pressure with respect to time is changed largely in the low differential pressure region which affects the braking performance largely, whereby the braking performance can be ensured. On the other hand, in the high differential pressure region which affects the stability largely, the upper limit value of the positive amount of change of the control differential pressure with respect to time is changed small, whereby the stability of the vehicle V can be ensured. Furthermore, the upper limit value of the positive amount of change of the control differential pressure with respect to time is changed to decrease gradually when the control differential pressure changes from the low differential pressure region to the high differential pressure region. Thereby, ensuring the braking performance in the low differential pressure region can be smoothly switched to ensuring the stability of the vehicle V in the high differential pressure region or vice versa.

Furthermore, the limit value setting section 43 sets the upper limit value of the positive amount of change of the control differential pressure with respect to time so as to decrease as the vehicle body velocity increases. Therefore, even if the upper limit value of the positive amount of change of the control differential pressure with respect to time is set to b large, the upper limit value of the positive amount of change of the control differential pressure with respect to time is set to be large in a low vehicle velocity condition where a change in behavior of the vehicle is small, and it is possible to prioritize ensuring of the braking performance. Also, if the upper limit value of the positive amount of change of the control differential pressure with respect to time is set to be large, in a high vehicle velocity condition where a change in behavior of the vehicle is large, the upper limit value of the positive amount of change of the control differential pressure with respect to time is set to be small, and it is possible to prioritize ensuring of the stability of the vehicle V.

The embodiments of the invention have been described heretofore. However, the invention is not limited thereto. It is possible to make various changes in design without departing from the spirit and scope of the invention defined by claims thereof.

For example, in the embodiments, the control differential pressure is set based on the detection values of both the steering sensor SS and the yaw rate sensor SY. However, the control differential pressure may be set based on the detection value of one of the steering sensor SS and the yaw rate sensor SY.

What is claimed is:

1. A vehicle brake hydraulic pressure control apparatus comprising:
   a hydraulic pressure adjusting unit that individually adjusts brake hydraulic pressures acting on wheel brakes for right and left front wheels and right and left rear wheels;
   a split road determining section that determines as to whether or not road surfaces which the right wheels and the left wheels are in contact with constitute a split road in which coefficients of friction of the road surfaces are different from each other, wherein if the split road determining section determines that the road surfaces constitute the split road when antilock braking control is executed, the hydraulic pressure adjusting unit is controlled to execute differential pressure control so that the brake hydraulic pressures of the wheel brakes on a higher coefficient-of-friction road side are higher than those of the wheel brakes on a lower coefficient-of-friction road side;

a steering angle sensor that detects a steering angle;

a yaw rate sensor that detects an actual yaw rate of a vehicle;

a vehicle body velocity acquiring section that acquires a velocity of a vehicle body;

a target yaw rate setting section that sets a target yaw rate based on the steering angle and the velocity of the vehicle body so as to be a value at which the vehicle turns to the higher coefficient-of-friction road side;

a yaw rate deviation calculation section that calculates a yaw rate deviation which is a difference between the target yaw rate and the actual yaw rate;

a feedback differential pressure calculation section that executes a PI operation in accordance with the yaw rate deviation to calculate a feedback differential pressure between the brake hydraulic pressures of the right and left wheel brakes so that the actual yaw rate approaches the target yaw rate;

a feedforward differential pressure calculation section that adds (i) a differential pressure based on the steering angle and (ii) a differential pressure based on the velocity of the vehicle body and the target yaw rate to obtain a feedforward differential pressure between the brake hydraulic pressures of the right and left wheel brakes;

an adding section that adds the feedback differential pressure and the feedforward differential pressure;

a control differential pressure setting section that sets a control differential pressure between the brake hydraulic pressures of the right and left wheel brakes based on a value obtained by the adding section, after a first setting time elapses since start of the differential pressure control; and a hydraulic pressure adjusting and driving section that drives the hydraulic pressure adjusting unit in accordance with the control differential pressure set by the control differential pressure setting section.

2. The vehicle brake hydraulic pressure control apparatus according to claim 1, wherein the target yaw rate setting section sets the target yaw rate so that the target yaw rate becomes smaller as the steering angle gets larger.

3. The vehicle brake hydraulic pressure control apparatus according to claim 1, further comprising:

a first lower limit setting section that sets a first lower limit differential pressure, which changes by an amount of change corresponding to the velocity of the vehicle body, based on the control differential pressure which is set by the control differential pressure setting section at a time at which the first setting time elapses since the start of the differential pressure control, wherein the control differential pressure setting section sets the control differential pressure to larger one of the value obtained by the adding section and the first lower limit differential pressure set by the first lower limit setting section.

4. The vehicle brake hydraulic pressure control apparatus according to claim 1, further comprising:

a limit value setting section that sets an upper limit value of a positive amount of change of the control differential pressure with respect to time, wherein the control differential pressure setting section sets the control differential pressure so that the control differential pressure changes by an amount of change being equal to or lower than the upper limit value set by the limit value setting section.

5. The vehicle brake hydraulic pressure control apparatus according to claim 4, wherein the limit value setting section sets the upper limit value based on the control differential pressure.

6. The vehicle brake hydraulic pressure control apparatus according to claim 5, wherein if the control differential pressure set by the control differential pressure setting section is in a low differential pressure region after a time at which the first setting time elapses since the start of the differential pressure control, the limit value setting section sets the upper limit value to be large, and if the control differential pressure set by the control differential pressure setting section is in a high differential pressure region after the time at which the first setting time elapses since the start of the differential pressure control, the limit value setting section sets the upper limit value to be small.

7. The vehicle brake hydraulic pressure control apparatus according to claim 6, wherein when the control differential pressure changes from the low differential pressure region to the high differential pressure region, the limit value setting section changes the upper limit value so that the upper limit value decreases gradually.

8. The vehicle brake hydraulic pressure control apparatus according to claim 4, wherein the limit value setting section sets the upper limit value to be small as the velocity of the vehicle body increases.

9. The vehicle brake hydraulic pressure control apparatus according to claim 3, further comprising:

a hydraulic pressure acquiring section that acquires at least the brake hydraulic pressures of the wheel brakes for the right and left front wheels;

a second lower limit setting section that sets, based on the control differential pressure set by the control differential pressure setting section a time at which the first setting time elapses since the start of the differential pressure control, a second lower limit differential pressure which changes, by an amount of change corresponding to the velocity of the vehicle body acquired by the vehicle body velocity acquiring section, more moderately than the first lower limit differential pressure changes;

a steering angle determination section that determines that the steering angle is in a fixed state, if a state continues for a second setting time in which the steering angle is below a steering angle threshold value which is determined in accordance with a difference between the brake hydraulic pressures, acquired by the hydraulic pressure acquiring section, of the wheel brakes for the right and left front wheels; and a selection section that selects the second lower limit differential pressure in place of the first lower limit differential pressure to input the second lower limit differential pressure to the control differential pressure setting section, if the steering angle determination section determines that the steering angle is in the fixed state, wherein if the steering angle determination section determines that the steering angle is in the fixed state, the control differential pressure setting section sets the control differential pressure to larger one of the value obtained by the adding section and the second lower limit differential pressure.

10. The vehicle brake hydraulic pressure control apparatus according to claim 1, further comprising:
a first lower limit setting section that sets a first lower limit differential pressure which changes by an amount of change corresponding to the velocity of the vehicle body, wherein
the control differential pressure setting section sets the control differential pressure based on at least one of the steering angle detected by the steering angle sensor and the actual yaw rate detected by the yaw rate sensor, and
after the first setting time elapses since the start of the differential pressure control, the control differential pressure setting section sets the control differential pressure with using the first lower limit differential pressure as a minimum value of the control differential pressure.

11. The vehicle brake hydraulic pressure control apparatus according to claim 10, further comprising:
a limit value setting section that sets an upper limit value of a positive amount of change of the control differential pressure with respect to time, wherein
the control differential pressure setting section sets the control differential pressure so that the control differential pressure changes by an amount of change being equal to or lower than the upper limit value set by the limit value setting section.

12. The vehicle brake hydraulic pressure control apparatus according to claim 11, wherein the limit value setting section sets the upper limit value based on the control differential pressure.

13. The vehicle brake hydraulic pressure control apparatus according to claim 12, wherein
if the control differential pressure set by the control differential pressure setting section is in a low differential pressure region after a time at which the first setting time elapses since the start of the differential pressure control, the limit value setting section sets the upper limit value to be large, and
if the control differential pressure set by the control differential pressure setting section is in a high differential pressure region after the time at which the first setting time elapses since the start of the differential pressure control, the limit value setting section sets the upper limit value to be small.

14. The vehicle brake hydraulic pressure control apparatus according to claim 13, wherein when the control differential pressure changes from the low differential pressure region to the high differential pressure region, the limit value setting section changes the upper limit value so that the upper limit value decreases gradually.

15. The vehicle brake hydraulic pressure control apparatus according to claim 11, wherein the limit value setting section sets the upper limit value to be small as the velocity of the vehicle body increases.

16. The vehicle brake hydraulic pressure control apparatus according to claim 10, further comprising:
a hydraulic pressure acquiring section that acquires at least the brake hydraulic pressures of the wheel brakes for the right and left front wheels;
a second lower limit setting section that sets, based on the control differential pressure set by the control differential pressure setting section a time at which the first setting time elapses since the start of the differential pressure control, a second lower limit differential pressure which changes, by an amount of change corresponding to the velocity of the vehicle body acquired by the vehicle body velocity acquiring section, more moderately than the first lower limit differential pressure changes;
a steering angle determination section that determines that the steering angle is in a fixed state, if a state continues for a second setting time in which the steering angle is below a steering angle threshold value which is determined in accordance with a difference between the brake hydraulic pressures, acquired by the hydraulic pressure acquiring section, of the wheel brakes for the right and left front wheels; and
a selection section that selects the second lower limit differential pressure in place of the first lower limit differential pressure to input the second lower limit differential pressure to the control differential pressure setting section, if the steering angle determination section determines that the steering angle is in the fixed state, wherein
if the steering angle determination section determines that the steering angle is in the fixed state, the control differential pressure setting section sets the control differential pressure with using the second lower limit differential pressure as a minimum value of the control differential pressure.

17. The vehicle brake hydraulic pressure control apparatus according to claim 6, wherein the control differential pressure setting section sets the control differential pressure based on at least one of the steering angle detected by the steering angle sensor and the actual yaw rate detected by the yaw rate sensor.

18. The vehicle brake hydraulic pressure control apparatus according to claim 17, wherein when the control differential pressure changes from the low differential pressure region to the high differential pressure region, the limit value setting section changes the upper limit value so that the upper limit value decreases gradually.

19. The vehicle brake hydraulic pressure control apparatus according to claim 17, wherein the limit value setting section sets the upper limit value to be small as the velocity of the vehicle body increases.

* * * * *